United States Patent [19]
Takara et al.

[11] Patent Number: 5,646,774
[45] Date of Patent: Jul. 8, 1997

[54] MODE-LOCKED LASER STABILIZING METHOD AND APPARATUS

[75] Inventors: Hidehiko Takara, Yokosuka; Satoki Kawanishi, Zushi; Masatoshi Saruwatari, Yokosuka, all of Japan

[73] Assignee: Nippon Telegraph and Telephone Corporation, Tokyo, Japan

[21] Appl. No.: 585,566

[22] Filed: Jan. 16, 1996

[30] Foreign Application Priority Data

Jan. 17, 1995 [JP] Japan .................................. 7-005288

[51] Int. Cl.$^6$ .............................. H01S 3/00; H01S 3/098
[52] U.S. Cl. .............................. 359/340; 359/18; 349/200
[58] Field of Search .............................. 359/340; 372/18, 372/94

[56] References Cited

U.S. PATENT DOCUMENTS

| | | | |
|---|---|---|---|
| 3,584,312 | 6/1971 | Statz | 331/94.5 |
| 3,611,187 | 10/1971 | Osterink et al. | 331/94.5 |
| 5,513,194 | 4/1996 | Tamura et al. | 372/6 |
| 5,546,414 | 8/1996 | Pfeiffer | 372/18 |

OTHER PUBLICATIONS

M. Kawachi et al., "Silica Waveguides on Silicon and Their Application to Integrated-optic Components", *Optical and Quantum Electronics*, vol. 22, pp. 391–416, 1990.

K. Hattori et al., "Erbium-doped Silica-based Planar-waveguide Amplifier Integrated with a 980/1530-nm WDM Coupler", Optical Fiber Communication 1994 Technical Digest, vol. 4, paper FB2, pp. 280–281, 1994.

A.E. Siegman, "Laser Spiking and Mode Competition," *Lasers*, University Science Books, Mill Valley, CA, chapter 25, pp. 954–969, 1986.

G. P. Agrawal, "Fiber Characteristics: Chromatic Dispersion," *Nonlinear Fiber Optics*, Academic Press, Inc., Chapter 1, pp. 7–8, 1989.

H. Takara et al., "20GHz transform-limited optical pulse generation and bit-error-rate operation using a tunable, actively mode-locked Er-doped fiber ring laser", Electron. Lett., 29(13):1149–1150 (1993).

X. Shan et al., "Stabilising ER fiber soliton laser with pulse phase locking", Electron. Lett., 28(2):182–184 (1992).

*Primary Examiner*—Mark Hellner
*Attorney, Agent, or Firm*—Finnegan, Henderson, Farabow, Garrett & Dunner, L.L.P.

[57] ABSTRACT

This invention is an improvement of a mode-locked laser stabilizing method and apparatus used with a mode-locked laser apparatus which comprises an optical cavity which consists of an optical modulator which modulates the loss or the phase of light at a fixed frequency, an optical delay line to electrically change the optical path length of the cavity, and an optical amplifier which amplifies a modulated optical pulses. In this method, at least one of the relaxation oscillation frequency components and the harmonic components in the output optical pulses of the mode-locked laser are extracted, and a process of controlling the optical delay line by using the extracted frequency component as an error signal for feedback control and to suppress the error signal below a fixed value.

8 Claims, 16 Drawing Sheets

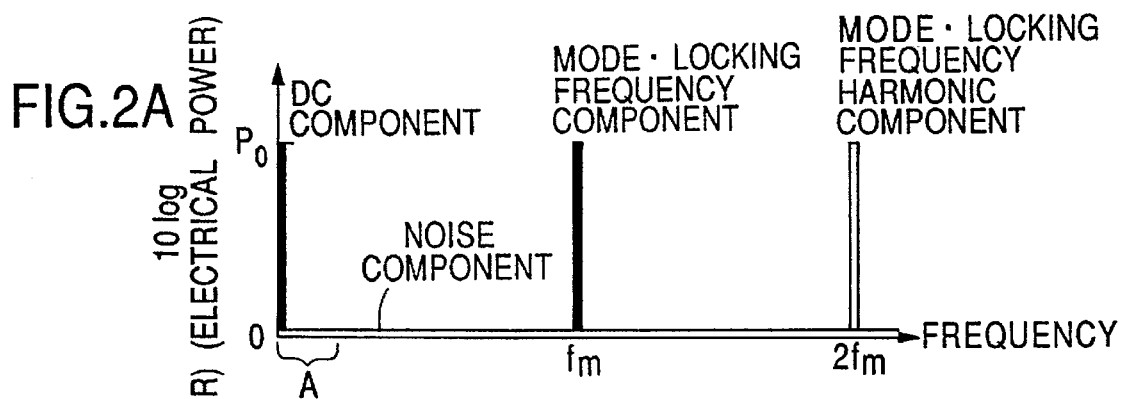
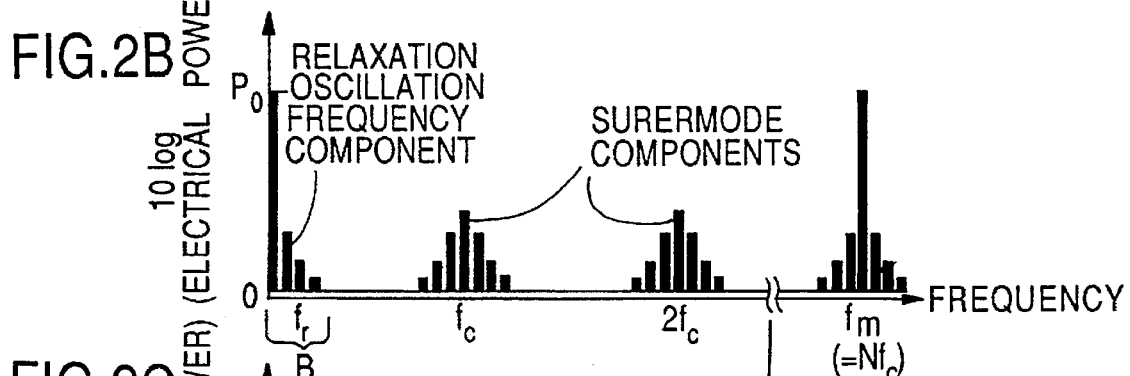
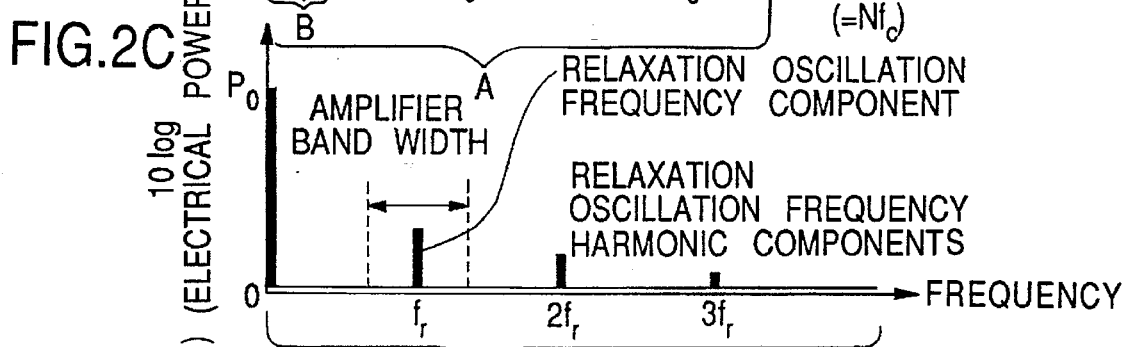
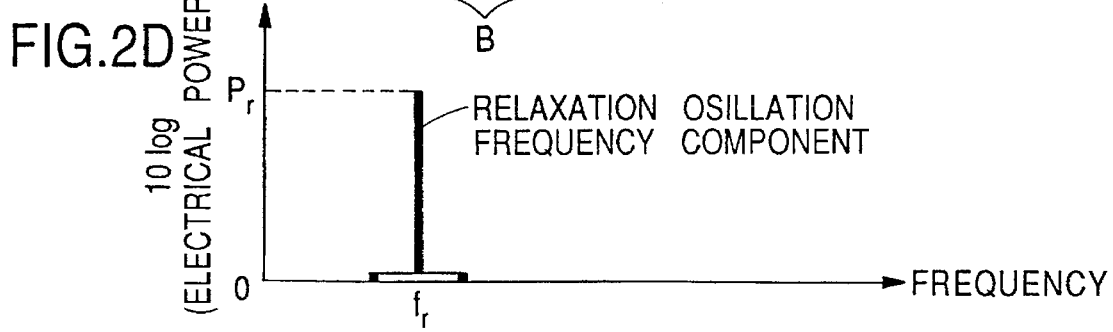

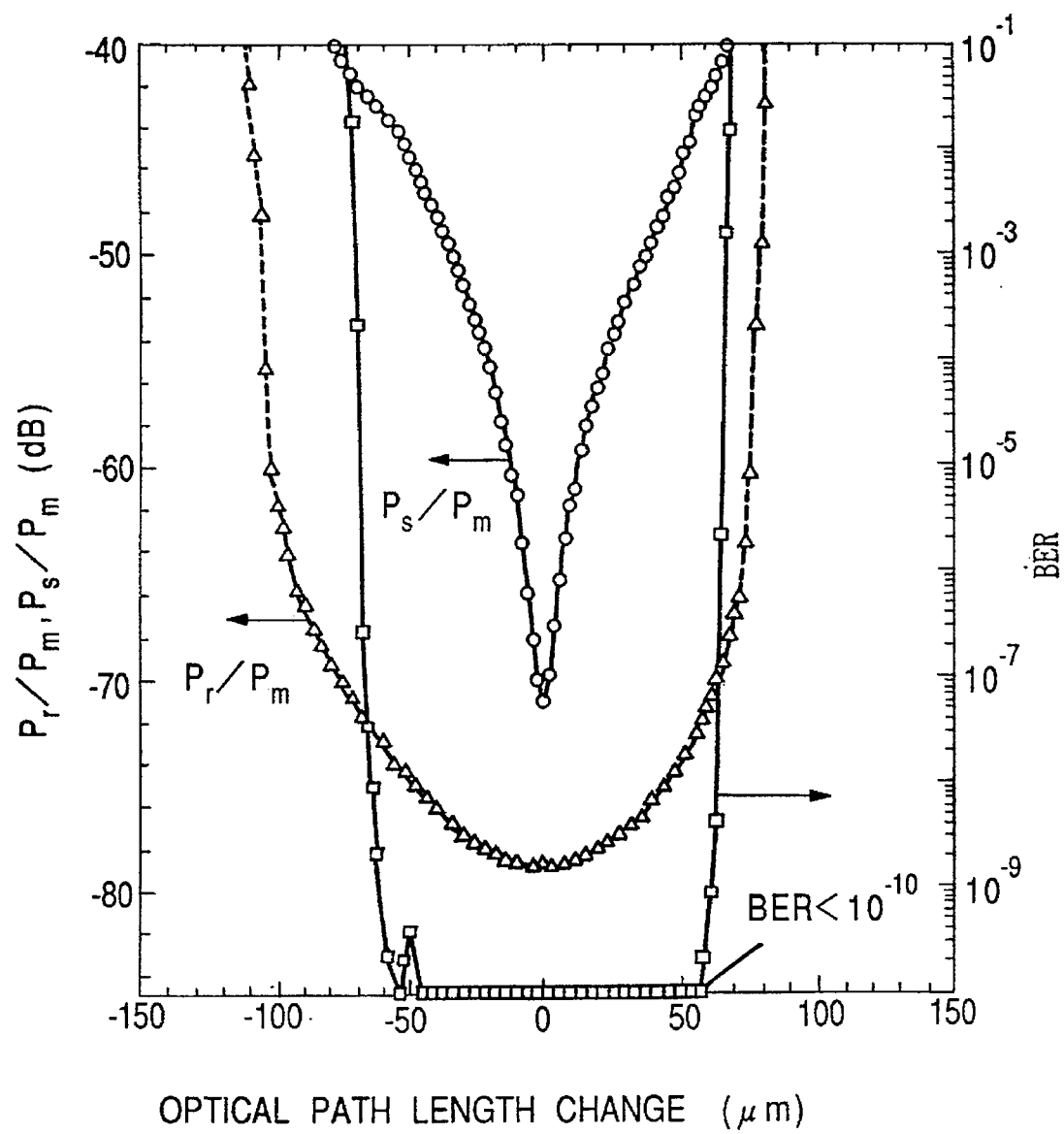

MODE-LOCKED LASER STABILIZING METHOD AND APPARATUS

BACKGROUND OF THE INVENTION

1. Field of the Invention

The invention relates to methods of, and apparatus for, stabilizing the output of a mode-locked laser which is used for optical communication, optical measurements, etc.

2. Description of the Related Art

Mode-locked lasers have many attractive features such as generation of optical pulses with high repetition frequency and short pulse duration. Therefore, these lasers have been actively investigated in order to apply them to the fields such as ultra-high speed and long distance optical communication, optical measurements, etc.

FIG. 17 A shows a conventional ring cavity-type mode-locked laser. The conventional ring cavity-type mode-locked laser which is shown in this figure consists of an optical modulator 102 to modulate the optical loss or phase with the specified frequency, a power supply 101 of the optical modulator 102, an optical amplifier 103 that amplifies the modulated optical signal, an optical isolator 104 that prescribes a direction of the propagation of optical signal and blocks off reflected light from optical components, an optical coupler 105 that outputs the amplified optical signal from the laser cavity, a wavelength tunable filter 106, and optical waveguides 107 that couple each of the above components optically (reference: H. Takara et al., "20 GHz transform-limited optical pulse generation and bit-error-rate operation using a tunable, actively mode-locked Er-doped fiber ring laser", Electron. Lett., vol. 29, No. 13, pp. 1149–1150, 1993).

As the optical modulator 102, a modulator which utilizes electro-optical effect of LiNbO$_3$, etc., is mainly used. As the wavelength tunable filter 106, a dielectric multiple-film filter is mainly used. As the optical waveguide 107, an optical fiber is mainly used. As the optical amplifier 103, a rare earth-doped fiber amplifier which is doped with rare earths such as Er and Nd, semiconductor laser amplifier, etc., are mainly used.

Referring to FIGS. 17B and 17C, operation principles of the conventional mode-locked laser will be explained. FIG. 17B shows a typical spectral characteristic by the mode-locking, and FIG. 17C shows its time characteristics.

As shown in FIG. 17A, the optical modulator 102, the optical amplifier 103, the optical isolator 104, and the optical coupler 105 are coupled together into a ring shape with the optical waveguides 107 to form a ring cavity. When the physical length and the refractive index of components of the ring cavity are "h" and "n", the optical path length L of the ring cavity is defined as the summation of products of each refractive index $n_i$ and each physical length $h_i$ as in the following formula (where "i" is a natural number).

$$L = \Sigma h_i n_i \quad (1)$$

For a ring cavity, multiple longitudinal modes exist with frequency intervals that are given by the fundamental cavity frequency $f_c = c/L$ (c is the velocity of light). When applying optical modulation with the following repetition frequency $f_m$ with the optical modulator 102 in the ring cavity, $$f_m = N \cdot f_c \quad (N \text{ is an integer equal to or greater than one}) \quad (2)$$

a mode-locked oscillation is established, in that all longitudinal modes at frequency intervals of $N \cdot f_c$ have their phases aligned as shown in FIG. 17B, and an optical pulse train with the repetition period of $1/(N \cdot f_c)$ is obtained as shown in FIG. 17C. This formula (2) expresses a mode-locking condition.

The pulse width corresponds to the reciprocal of the oscillation spectral width dv which is determined with the envelope of multiple longitudinal mode spectra, and the center of this spectral envelope is a central wavelength (optical frequency $v_0$).

In addition, when the optical path length of the cavity L changes due to a temperature change, etc. the above-described longitudinal mode frequency interval $f_c$ also changes. Therefore, to fulfill the mode-locking condition according to the above formula (2), the modulation frequency $f_m$ must be changed in response to the change of $f_c$. That is, to achieve a mode-locking condition without being influenced by the change of the cavity length, the modulation frequency $f_m$ must be changed in response to the change of the cavity optical path length. However, generally, because the modulation frequency $f_m$ was fixed, it was difficult to respond to a change of the cavity optical path length due to the temperature change, etc., and previous mode-locked lasers, such as those described above, were not practical.

To solve this problem, some methods for stabilizing the output of a mode-locked laser have been proposed by, for example, X. Shan (reference: X. Shan, et al., "Stabilising Er fiber soliton laser with pulse phase locking", Electron. Lett., vol. 28, No. 2, pp. 182–184, 1992).

FIG. 18 is a schematic diagram of this conventional method. In this conventional method, the phase difference between a mode locked frequency component $S_{m1}$ from power supply 201 and a mode locked frequency component $S_{m2}$ of the electrical signal that was obtained from a laser output by photoelectric conversion, and the cavity optical path length is controlled by an optical delay line 208 in the cavity to suppress the change of the phase difference. However, in this conventional method, because the stability of the laser output mainly depended on the initialization of the cavity optical path length, considerably precise adjustments of the cavity optical path length were required at the beginning of laser operation. Also, because it was necessary to change the cavity length when changing a mode locked frequency, the mode locked frequency could not be easily changed. Moreover, this method has a problem of low reliability because it does not monitor the stability of the laser output directly.

For example, when, the temperature, etc., changes the propagation length of the mode locking frequency component $S_{m1}$, from power supply 201 to phase comparator 241, the cavity optical path length is also changed to maintain the phase difference of the mode locking frequency component to be constant, and the laser operation shifts out of the mode-locking condition and the laser output becomes unstable. Also, because the output frequency of the power supply is generally more than 2 GHz, high-speed operation is required for photoelectric converter 210, phase comparison receptacle 241, and peripheral circuits thereof.

SUMMARY OF THE INVENTION

It is an object of the invention to provide a mode-locked laser stabilizing method and apparatus with high stability and high reliability by using the relaxation oscillation frequency component that can be used as the index of the stability of laser output.

The present invention provides a method of stabilizing the output of a mode-locked laser, wherein the laser includes an optical modulating device, an optical path length changing device for electrically changing the optical path length of the cavity, and an optical amplifying device for amplifying the modulated optical signal output from the optical modulating device, which comprises a step of extracting at least one component of the relaxation oscillation frequency component and its harmonic components of the laser output as an error signal of feedback control; and a step of adjusting the optical path length by the optical path length changing device to set the optical path length to suppress the error signal below a predetermined value.

The invention also provides apparatus for stabilizing the output of a mode-locked laser, that comprises an optical modulating device for modulating an input optical signal with a specified frequency, and an optical amplifying device for amplifying the modulated optical signal output from the optical modulating device; an optical delay device for electrically changing an optical path length of the cavity; an optical branching device for splitting a part of the laser output; an extracting device for converting the split optical signal into an electrical signal and for extracting at least one out of the relaxation oscillation frequency component and its harmonic components of the electrical signal as an error signal of feedback control; and an electrical signal processing device for inputting the error signal and for outputting a signal to drive the optical delay device to suppress the electrical power of the error signal below a predetermined value.

According to the above configurations, an optical path length changing device or an optical delay device in the cavity are controlled to suppress the relaxation oscillation frequency component of the electrical signal, which is converted from the optical signal output from the mode-locked laser, below a fixed value by using feedback control.

This configuration may prevent a change of the laser cavity optical path length; and stable mode-locked operation can be realized thereby.

BRIEF DESCRIPTION OF THE DRAWINGS

FIGS. 2A, 2B, 2C and 2D are diagrams that show electrical power spectra of a mode-locking frequency component, a fundamental cavity frequency component, a relaxation oscillation frequency component, and its harmonic components in the mode-locked laser shown in FIG. 1. The section of FIG. 2A labeled "A" is shown enlarged in FIG. 2B by the section correspondingly labeled "A". The section of FIG. 2B labeled "B" is shown enlarged in FIG. 2C by the section correspondingly labeled "B".

FIG. 3 is a diagram that shows a measurement result of cavity optical path length dependence of electrical power ratios between the relaxation oscillation frequency component and the mode-locking frequency component $P_r/P_m$ and between the supermode component and the mode-locking frequency component $P_s/P_m$, and an error rate.

DESCRIPTION OF THE PREFERRED EMBODIMENTS

Figure 1:
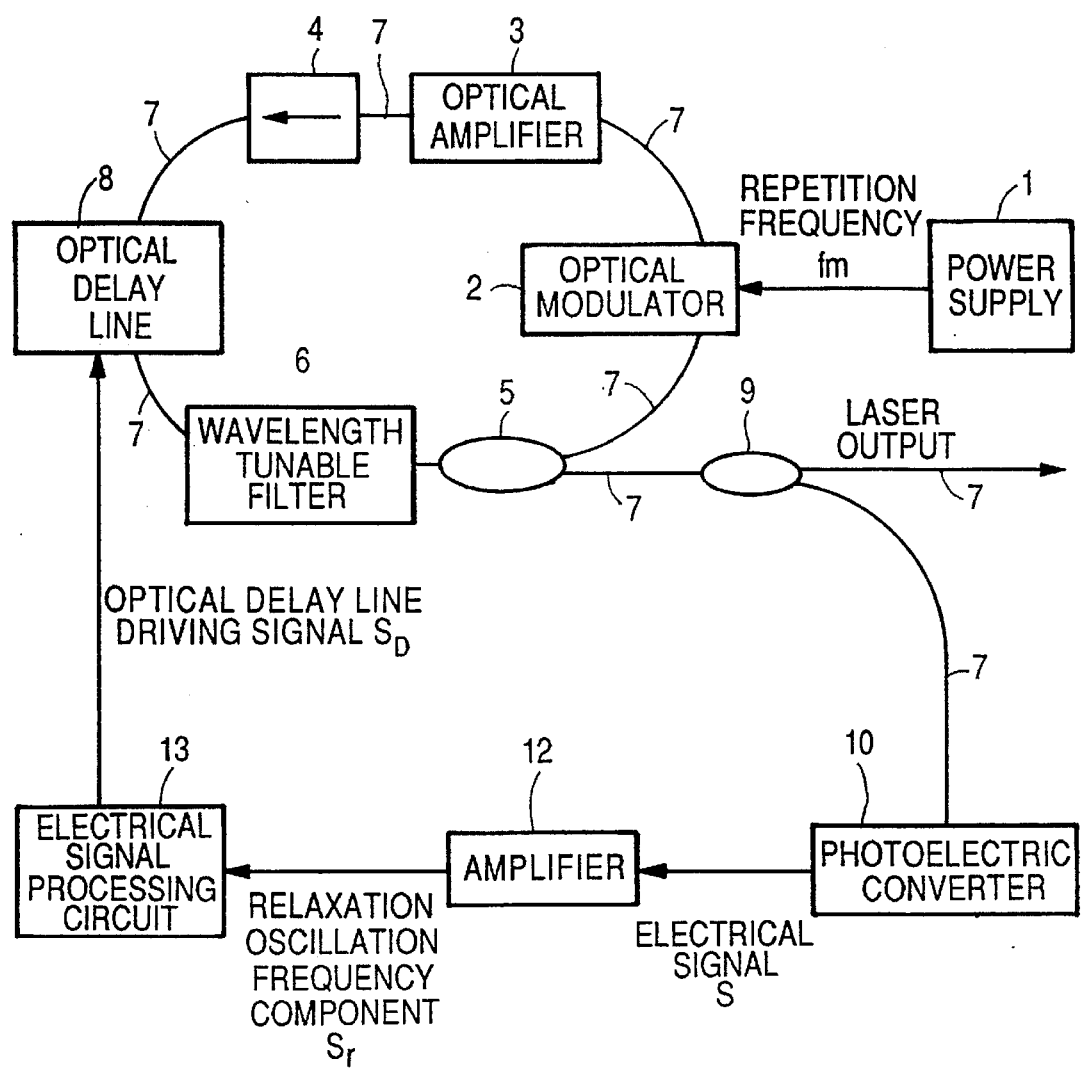
FIG. 1 is a schematic diagram of a first preferred embodiment according to this invention.

Hereinafter, referring to the drawings, the preferred embodiments of this invention will be explained.

First Preferred Embodiment

Figure 17A:
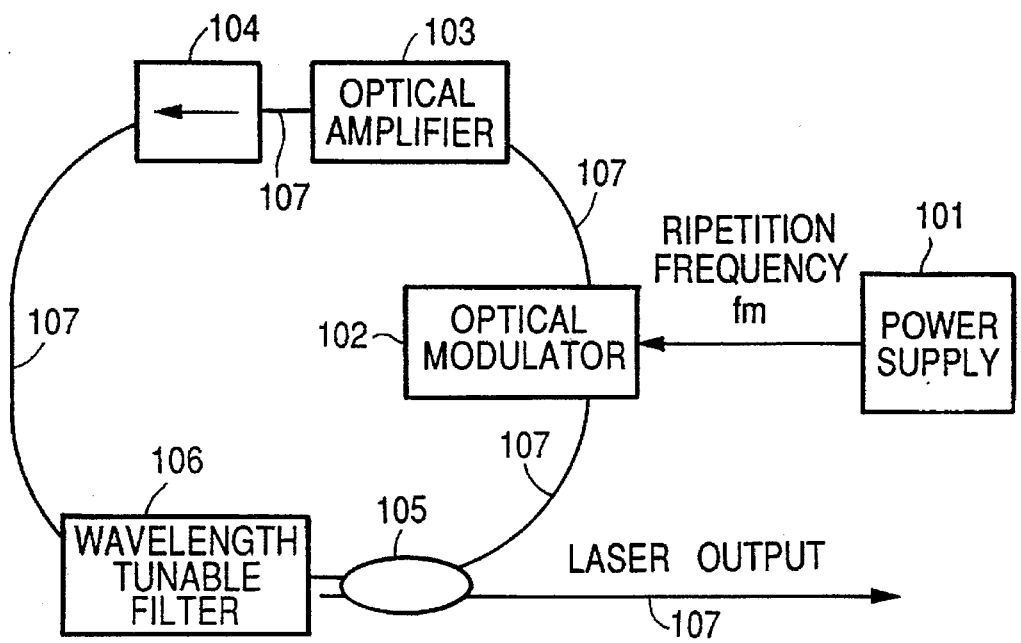
FIGS. 17A is a block diagram which shows a composition example of a conventional mode-locked laser.
Figure 17B:
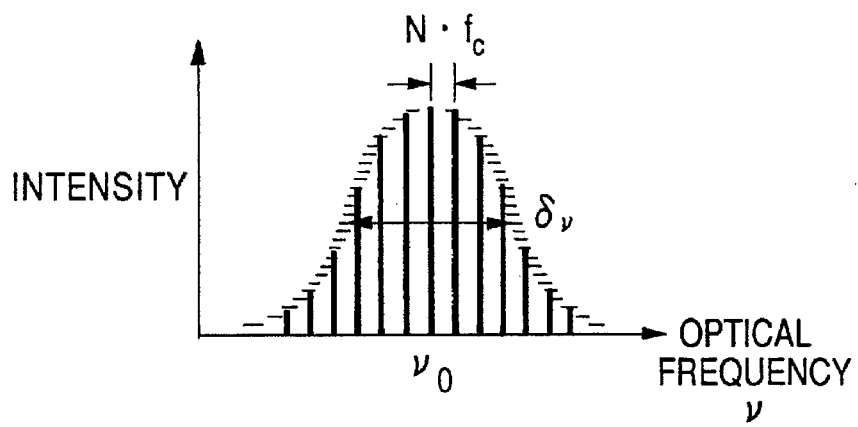
FIGS. 17B and 17C are graphs which show operation characteristics of the laser shown in FIG. 17A.
Figure 17C:
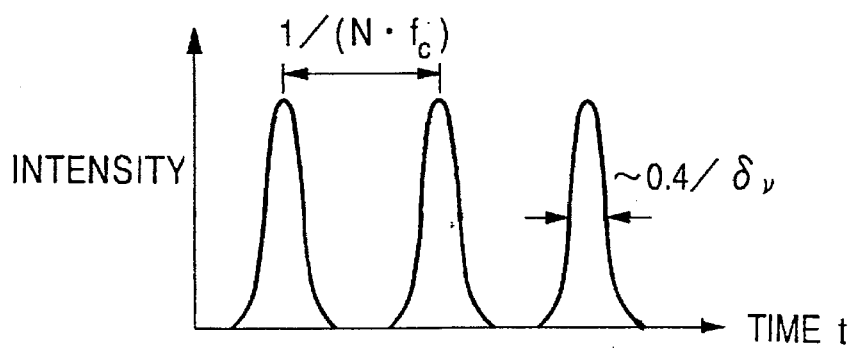
Figure 18:
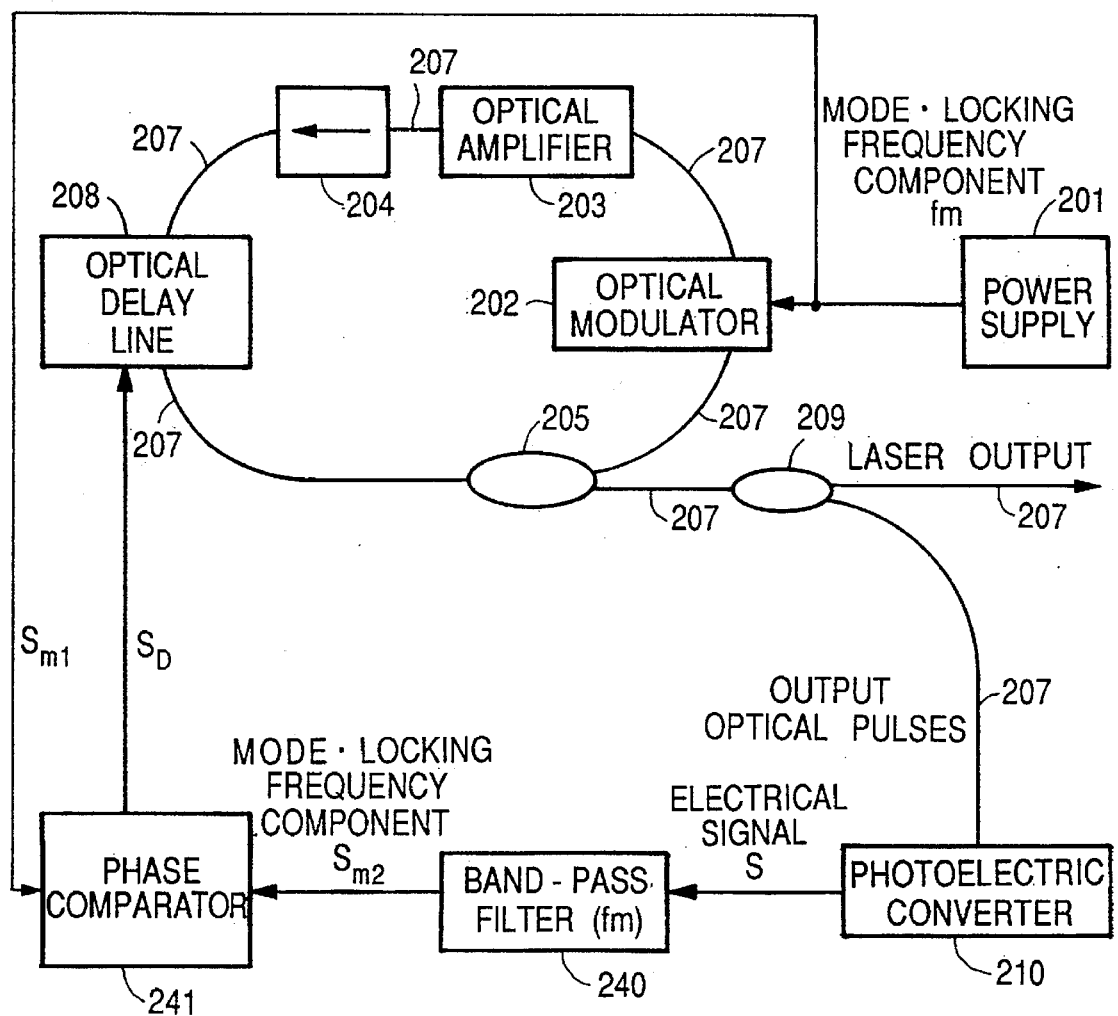
FIG. 18 is a block diagram of another conventional mode-locked laser.

FIG. 1 is a diagram which shows a first preferred embodiment of the stabilizing apparatus of a ring cavity-type mode-locked laser, according to this invention. The ring cavity-type mode-locked laser which is shown in this figure has a power supply 1 for an optical modulator 2, art optical modulator 2, an optical amplifier 3, an optical isolator 4, an optical coupler 5 and a wavelength tunable filter 6, which respectively correspond to the power supply 101, the optical modulator 102, the optical amplifier 103, the optical isolator 104, the optical coupler 105 and the wavelength tunable filter 106 of the prior art, which is shown in FIG. 17A, and which are main components of a ring cavity-type mode-locked laser.

The optical waveguide 7 is comprised of an optical fiber like the above-described conventional example (optical waveguide 107 in FIG. 17A) and/or a channel-type waveguide formed on a plane substrate, e.g. a planar lightwave circuit (reference: M. Kawachi et al., "Silica waveguide on silicon and their application to integrated-optical components", Opt. & Quanturn Electron., vol. 22, pp. 391–416). The optical amplifier 3 is comprised of a rare earth-doped fiber amplifier or a semiconductor laser amplifier like a conventional example (optical amplifier 103), and/or a rare earth doped planar-type amplifier which is made by doping rare earth in the above planar lightwave circuit, etc., (reference: K. Hattori et al. "Erbium-doped silica-based planar-waveguide amplifier integrated with a 980/1530-nm WDM coupler", in Optical Fiber Communication 1994 Technical Digest Series, Volume 4, paper FB2).

An optical coupler 9 splits the output light from the optical coupler 5 in two, and outputs one as the laser output, and outputs the other to a photoelectric converter 10. The photoelectric converter 10 changes an incident optical signal from the optical coupler 9 into an electrical signal, and outputs it to an amplifier 12 as an electrical signal S. The amplifier 12 extracts a relaxation oscillation frequency component signal $S_r$ from the electrical signal S and outputs it to an electrical signal processing circuit 13. The electrical signal processing circuit 13 outputs the driving signal $S_D$ to control the optical delay line 8 for suppressing the electrical power $P_r$ of the relaxation oscillation frequency component $S_r$ below a predetermined value. Then, the optical delay line 8 changes the optical path length of the cavity according to the driving signal $S_D$.

Next, details about the optical delay line 8, the photoelectric converter 10, the amplifier 12, and the electrical signal processing circuits 13 will be explained.

Photoelectric converter 10 changes the optical signal, which is generated by the ring-cavity mode-locked laser and split by the optical coupler 9, into the electrical signal S.

If the driving condition of the mode-locked laser completely fulfills the mode-locking condition (formula (2); $f_m = N \cdot f_c$), as the electrical power spectrum of the electrical signal S, the bright-line spectra of the direct current component, the mode-locking frequency (=the modulation frequency) fm component and harmonic ($2f_m, 3f_m, \ldots$) components of the mode locked frequency can be obtained as shown in FIG. 2A.

However, because the relaxation oscillation of the laser is excited when the cavity length changes, the mode-locking condition is not fulfilled and the output of the laser becomes unstable thus, a relaxation oscillation frequency component $f_r$ and its harmonic frequency components ($2f_r, 3f_r, \ldots$) occur on the electrical power spectrum. For example, in the case of the four-level laser, the relaxation oscillation frequency $f_r$ is expressed by the following formula (reference: "Lasers", SIEGMAN, A. E., (University Science Books, Mill Valley, Calif. 1986), chapter 25, p. 964).

$$f_r = \frac{1}{2\pi} \sqrt{\frac{r-1}{\tau t_c}} \quad (3)$$

Here, "r" is the ratio between a pumping rate to a higher level and a threshold pumping rate, "$\tau$" is the lifetime of the higher level, and "$t_c$" is a cavity decay time. In the case of a fiber laser which uses a rare-earth-doped fiber as its amplification medium, because r is 1–10, $t_c$ is 1 μs -10 μs, and $\tau$ is 1 μs-10 ms, $f_r$ becomes 10–500 kHz.

Also, in the case of a harmonically mode-locked laser, noise components except the relaxation oscillation also exist. In a "K"th order ("K" is an integer equal to or greater than 2; "K"th order: second order, third order, forth order, . . . , K-th order) harmonic mode-locked laser, a longitudinal mode is locked to the ones K longitudinal modes apart on each side. Therefore, there are K sets of mode-locked longitudinal modes, and each of them is called a supermode (reference: "Lasers", SIEGMAN, A. E., (University Science Books, Mill Valley, Calif. 1986), chapter 27, p. 1073). When the laser operates under a stable condition, because only one supermode exists in the electrical power spectrum, there exist only the direct current component, the mode locking frequency (=a modulation frequency) $f_m$ component, and the harmonic ($2f_m, 3f_m, \ldots$) components of the mode locking frequency like the above. However, because the other supermodes are excited when the mode-locking condition is not fulfilled, the supermode components occur at intervals of a fundamental cavity frequency $f_c$ in the electrical power spectrum. Because fiber lasers generally have a cavity length of several-tens of meters, fundamental cavity frequency $f_c$ is from several MHz to tens of MHz.

Therefore, in the case of unstable operation harmonically mode-locked fiber lasers, the relaxation oscillation frequency components $f_r$ and its harmonic frequency components ($2f_r, 3f_r, \ldots$), and unnecessary supermode components $f_s (= n \cdot f_c \neq m \cdot f_m$ (n, m: natural numbers)) generate. Moreover, beat frequencies thereof are also generated. In the case of unstable operation, the noise component frequency $f_n$ below occurs.

$$f_n = i \cdot f_m \pm j \cdot f_r \pm k \cdot f_c (i=0, 1, 2, \ldots; j \text{ and } k \text{ are natural numbers}) \quad (4)$$

Here, $f_n$ is larger than 0. The electrical power spectrum becomes as shown in FIGS. 2B and 2C.

FIG. 2B is an enlargement of a part (the part is the section labeled "A".) of FIG. 2A, which is enlarged in the axis of frequency; and FIG. 2C is a diagram which is drawn by enlarging a part (the section labeled "B") of FIG. 2B in the same way. The value of the electrical power $P_r$ of this relaxation oscillation frequency component changes in response to the detuning from the mode-locking condition (the change of cavity optical path length L).

FIG. 3 shows a measurement result of relation between the optical path length change of the cavity and the electrical power $P_r$ of the relaxation oscillation frequency component at a mode-locked Er doped fiber ring laser. In FIG. 3, the ratio between $P_r$ and the electrical power $P_m$ of the mode locked frequency component is used. To evaluate the stability of the laser output at the same time, after modulating and coding the laser output by an external optical intensity modulator, a bit error rate (BER) characteristic is also measured (reference: H. Takara, et al., "20 GHz transform-limited optical pulse generation and bit-error-rate operation using a tunable, actively mode-locked Er-doped fiber ring laser", Electron. Lett., vol. 29, No. 13, pp. 1149–1150, 1993).

This error rate depends on the signal-to-noise ratio of the optical signal light. In the case of unstable operation, because a lack of optical pulses and extreme fluctuation of optical intensity occur, the signal-to-noise ratio of the laser output deteriorates, and the error rate increases. To use a mode-locked laser as a light source in optical transmission, the error rate of $10^{-10}$ or less is required.

As shown in FIG. 3, the allowable range of the optical path length change to keep a bit error rate less than $10^{-10}$ is about ±50 μm, and the relaxation oscillation frequency component $P_r$ changes more than approximately 10 dB in response to the optical path length change of 10 μm. Therefore, sensitive control of the cavity optical path length can be realized, which prevents the optical path length from changing and leads to stable mode-locked operation by extracting a relaxation oscillation frequency component and using it as an error signal (see FIG. 2D). In addition, although the amplifier 12 is adopted in the above explanation, if the relaxation oscillation frequency component is sufficiently large to be used for the control of the succeeding stages without amplifying, a band pass filter may be used instead of the amplifier 12.

The amplifier 12 selects and amplifies only the relaxation oscillation frequency component $S_r$ as the error signal in the above explanation, but harmonic frequency components of the relaxation oscillation frequency component may be contained additionally as the error signal.

Next, the band width of the amplifier 12 (or the band pass filter) will be explained.

As for the electrical power spectrum of the electrical signal S, which is converted from the laser output light with the photoelectric converter 10, the electrical power of the direct current component and the mode-locked frequency components (including harmonic frequency components) are almost constant regardless of a change of the cavity length; and their levels are higher than the relaxation oscillation frequency component by more than 70 dB in a stable condition. On the other hand, the supermode component as well as the relaxation oscillation frequency component changes in response to a change of the cavity length, but this change is small (see dotted line ($P_s/P_m$) in FIG. 3). Therefore, to achieve sensitive control, it is preferable for the band of the amplifier 12 (or the band pass filter) to be set to pass only the relaxation oscillation frequency and its harmonic frequencies, and to be set not to pass the direct current component, the mode-locking frequency components (including harmonic frequency components), and supermode components. That is, when the relaxation oscillation frequency $f_r$ is lower than the fundamental cavity frequency $f_c$; supposing which $f_L$ and $f_H$ are the lower and the upper bound frequencies of the band of the amplifier 12 (or the band pass filter), respectively, these frequencies may be arranged in the following order $$0 < f_L < f_r < f_H < f_c \tag{5a}$$

When the relaxation oscillation frequency $f_r$ is greater than $kf_c$ and less than $(k+1) f_c$; where "k" is a natural number, those frequencies may be set in the following order.

$$kf_c < f_L < f_r < f_H < (k+1)f_c \tag{5b}$$

In the case of the above-described fiber laser, for example, when the amplifier 12 (or the band pass filter), whose band is defined at $0 < f_L < 10$ kHz and $500$ kHz $< f_H < 1$ MHz, is used, because only the relaxation oscillation frequency component and its harmonic frequency components can be used as an error signal, control of the cavity length with good sensitivity can be achieved. In the case of semiconductor lasers, the same arrangement may be used according to formula (5a) or formula (5b). However, in this case, since both the relaxation oscillation frequency and the fundamental cavity frequency are more than 1 GHz because of a shorter cavity length, an amplifier of GHz band is desirable.

Figure 4A:
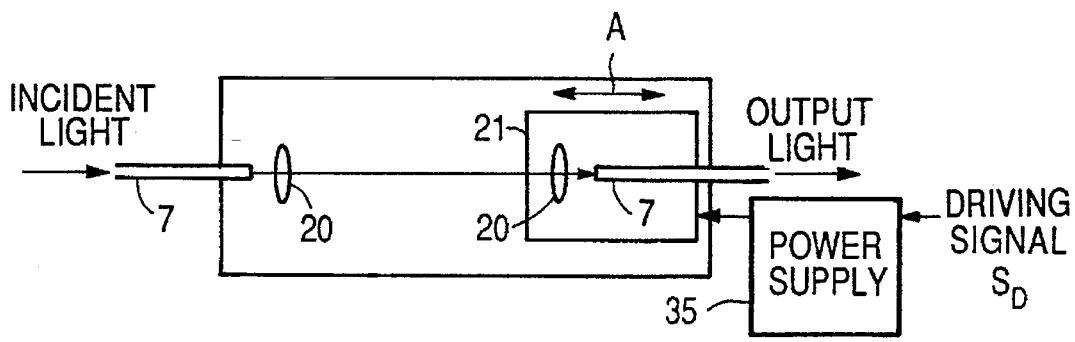
FIGS. 4A and 4B are schematic diagrams that show concrete examples of the optical delay line which is shown in FIG. 1, and FIGS. 4C and 4D are diagrams that show an example of driving signal $S_D$ and time dependence of movement amount of each optical delay line in response to the driving signal $S_D$, respectively.
Figure 4B:
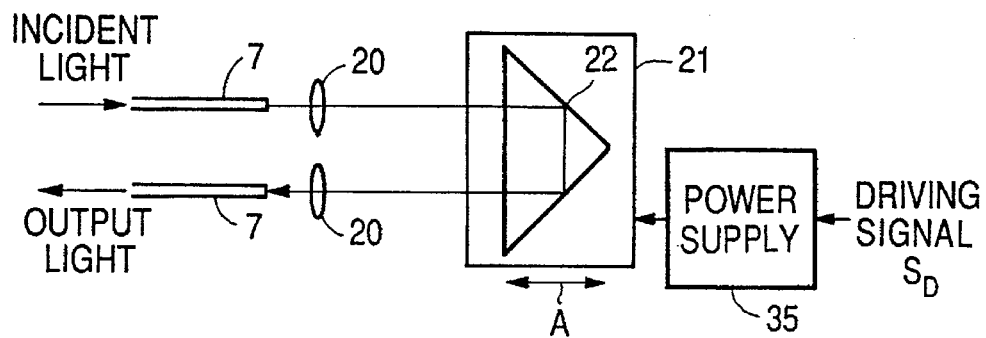
Figure 4C:
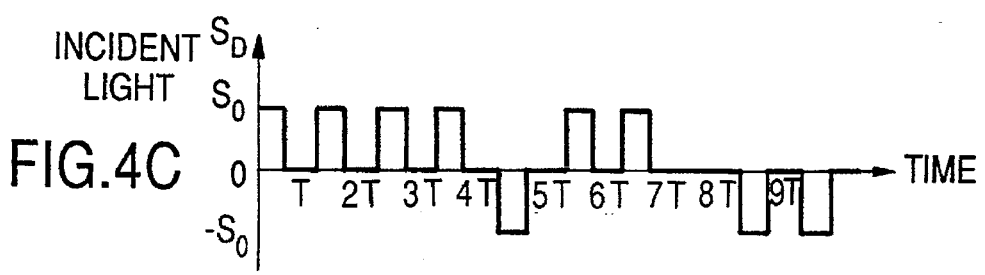
Figure 4D:
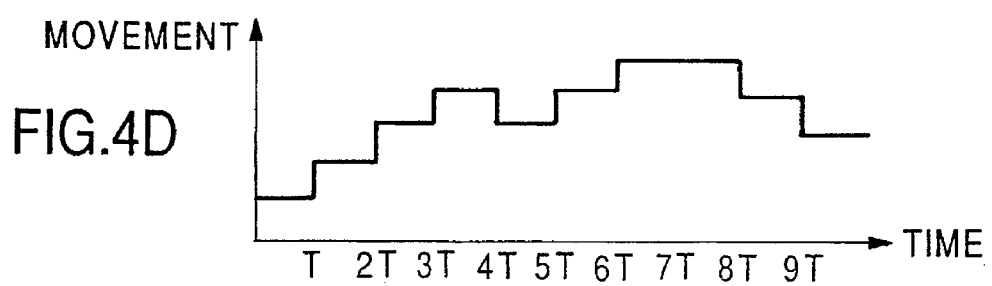

Moreover, since any longitudinal-mode frequency components of a laser are not used as an error signal in the invention, the invention can be applied to mode-locked oscillations at any longitudinal mode frequencies (=$N \cdot f_c$(N: natural numbers)) with the same configuration. FIGS. 4A and 4B show optical delay lines which are examples of the optical delay line 8 shown in FIG. 1. Each of optical delay lines in FIGS. 4A and 4B utilizes two optical waveguides optionally coupled with lenses. These optical delay lines comprise an electrical stage 21 which is electrically moved in the directions of the arrow "A", optical lenses 20, power supply 35, right-angle mirrors 22 such as a triangular prism, etc. The optical delay line in FIG. 4A changes optical path length between two optical waveguides 7 by fixing either of two optical lenses 20 and a corresponding optical waveguide 7 thereto on the identical electric stage 21 and by moving these components along the beam direction. The optical delay line in FIG. 4B can control optical path length by moving the right-angle mirror 22 along the beam direction in the same way. For example, the electric driving stage 21 of these optical delay lines may be driven by pulse driving signals. In the case of using the optical delay lines in FIGS. 4A and 4B driven by pulse driving signals, the direction of movement is changed according to the polarity of input electricity pulses as shown in FIG. 4C. The amount of movement is determined by the number of the input electricity pulses, which are input as the driving signal $S_D$.

Figure 5A:
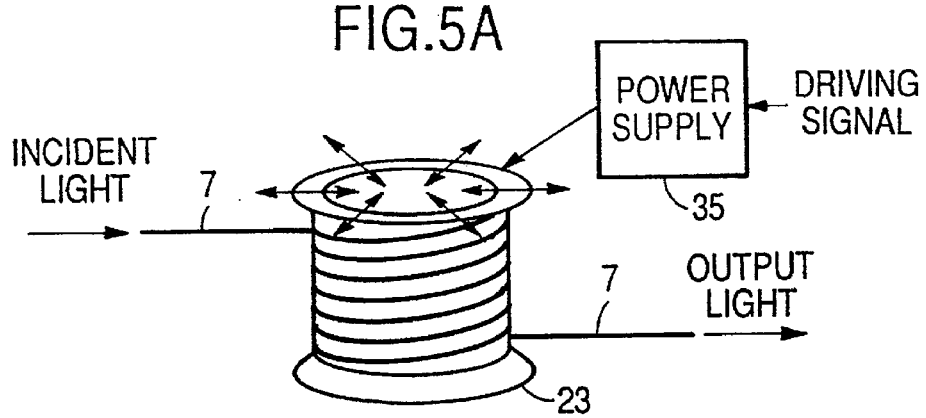
FIGS. 5A and 5B are schematic diagrams that show other concrete examples of the optical delay line shown in FIG. 1.

FIG. 5A shows another example of the optical delay line 8 which changes the optical path length by elongating an optical waveguide with tensile force. This optical delay line changes the optical path length by changing a tensile force onto the optical waveguide 7 such as a relatively longer optical fiber, which is wound on a drum 23 which is made of a piezoelectric device. The diameter of the drum 23 is varied by changing the voltage output from power supply 35.

Figure 5B:
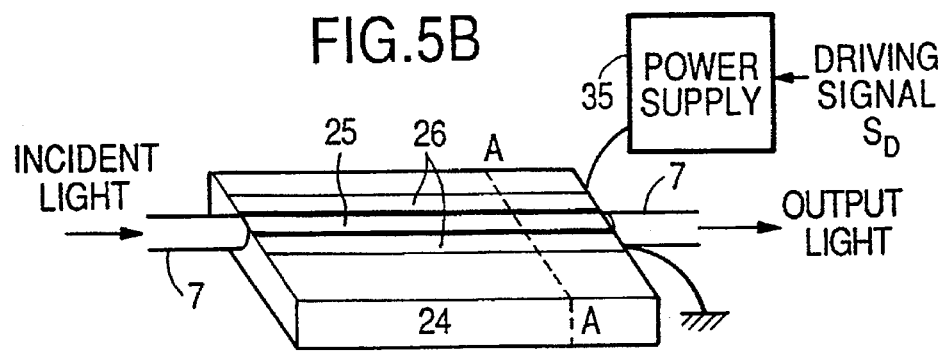
Figure 5C:
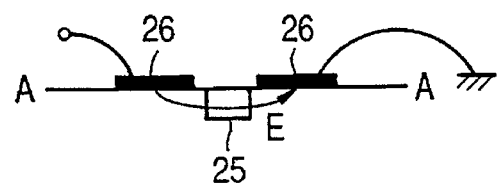
FIG. 5C is a section drawing that shows the section of the part A—A in FIG. 5B.
Figure 5D:
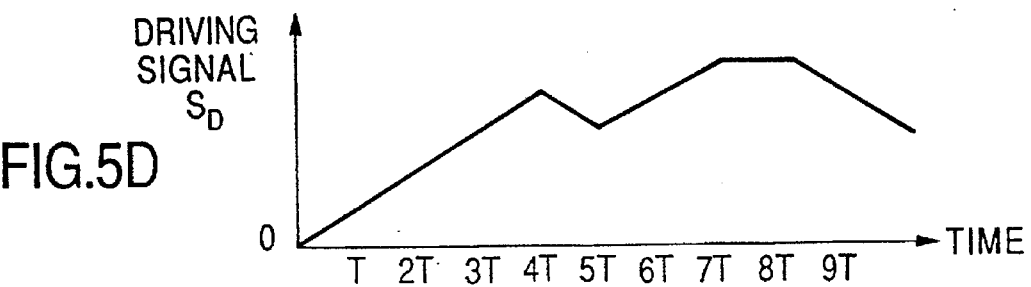
FIG. 5D and 5E are diagrams that shows time dependence of movement amount of each optical delay line in response to driving signal $S_D$.
Figure 5E:
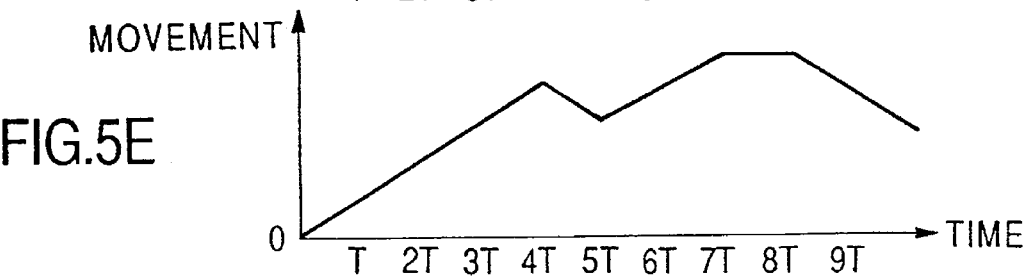

FIG. 5B is a diagram which shows another example of the optical delay line 8 which changes the optical path length of an optical waveguide by electrically varying the refractive index of the optical waveguide. This optical delay line comprises a substrate 24, an optical waveguide 25 whose refractive index can be changed electrically, and electrodes 26. Electric field E occurs in the optical waveguide 25 by applying a voltage between two electrodes 26; and the refractive index of the optical waveguide 25 changes; and then the optical path length changes (see FIG. 5C). Ferroelectric substances such as $LiNbO_3$, which provide electro-optical effect, may be used as the optical waveguide 26. In the case of optical delay lines in FIGS. 5A and 5B, the amount of movement is determined by absolute values of input electrical signals (driving signal $S_D$) as shown in FIGS. 5D and 5E.

Therefore, feedback control of the cavity length of a mode-locked laser can be achieved by using at least one out of optical delay lines which are shown in FIGS. 4A, 4B, 5A and 5B.

An example of the algorithm of signal processing processes in the electrical signal processing circuit 13 will be explained below.

Figure 9:
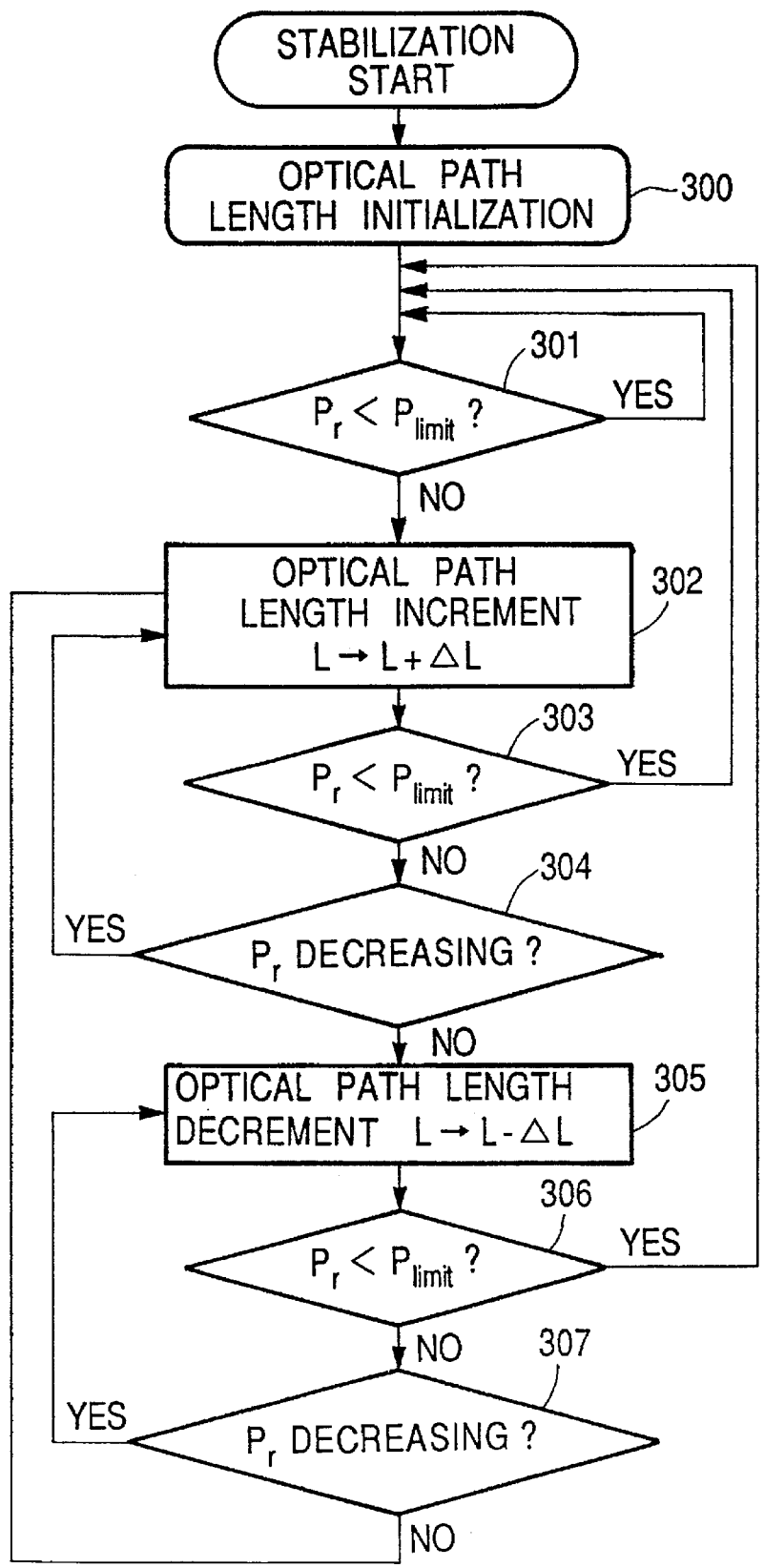
FIG. 9 is a diagram which shows one example of a basic algorithm of operation of the electrical signal processing circuit 13 which is shown in FIG. 1.

A basic algorithm is shown in FIG. 9. The driving signal $S_D$ to be input into the optical delay line 8 varies depending on the type of the optical delay line 8 used.

Figure 6:
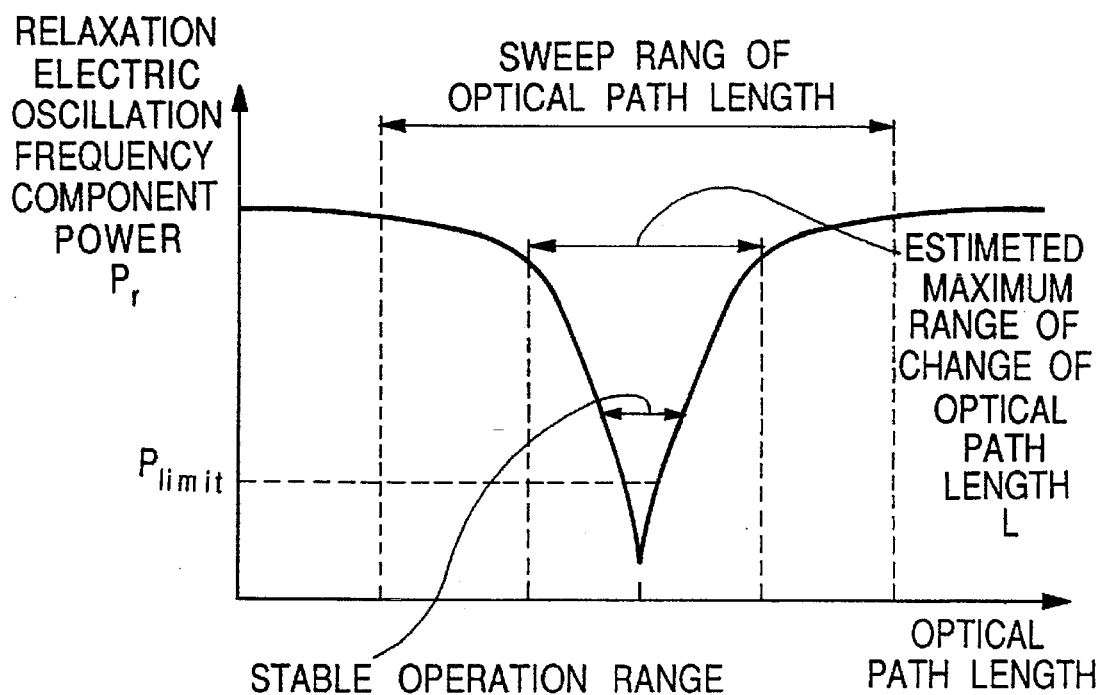
FIG. 6 is a diagram which shows the relationship between the optical path length of a cavity L and the electrical power of the relaxation oscillation frequency component $P_r$.

The case of using the optical delay line in FIGS. 4A or 4B as the optical delay line 8 in FIG. 1 will be described hereinafter. In this case, first of all, the electrical power Pr of the relaxation oscillation frequency component is measured during the time when the cavity optical path length is swept at some range by changing the driving signal $S_D$, i.e., by changing the number of the driving pulse signals. This sweep range of the optical path length may be predetermined to be sufficiently wider than the estimated maximum detuning from the optical path length at the mode-locking condition; the detuning occurs by temperature change, etc. FIG. 6 is a diagram which shows an example of the typical relationship between the electrical power $P_r$ of the relaxation oscillation frequency component and the optical path length L, which is obtained by such a sweep.

After detecting an optical path length $L_0$, where the electrical power $P_r$ of the relaxation oscillation frequency component is minimum and the driving signal $S_D$ therein and the initial value of the optical path length is set to be the value of $L_0$ again by inputting this driving signal $S_D$ into the optical delay line 8 (step 300). The initial value of the optical path length of the cavity is determined by this process in the stabilization algorithm. Since optical delay lines in FIGS. 4A and 4B have structures which can maintain the amount of the optical delay just as it is, even if the driving signals are stopped, the driving signal value $S_D$ may be continuously 0 after which until the electrical power $P_r$ of the relaxation oscillation frequency component has started changing. When a temperature change, etc., changes the optical path length, and the electrical power $P_r$ of the relaxation oscillation frequency component exceeds a predetermined limit value $P_{limit}$ ($P_{limit}$: a value which is smaller than the upper limit of the electrical power $P_r$, below which the operation condition can be regarded as stable for usage; see FIG. 6) (step 301), the optical delay line driving signal $+\Delta S_D$ is input into the optical delay line 8 to increase the optical path length $(+\Delta L)$ at first (step 302). Here, $\Delta S_D$ and $\Delta L$ express a differential change of the drying signal $S_{Da}$ and a differential change of the optical path length L, respectively.

After that, if the electrical power $P_r$ decreases (step 304), the driving signal change of $+\Delta S_D$ is re-input to further increase the optical path length L (step 302). This process is repeated until the electrical power $P_r$ is below the electrical power limit value $P_{limit}$ (steps 302–304). When $P_r$ is less than $P_{limit}$, the optical delay line driving signal $S_D$ is restored to 0, and detection of the electrical power $P_r$ of the relaxation oscillation frequency component is continued (step 303→step 301). In contrast, if the electrical power $P_r$ increases (step 304) at the time when the optical delay line driving signal$+\Delta S_D$ is input to the optical delay line 8 (step 302), polarity of the optical delay line driving signal is changed to $-\Delta S_D$ to decrease the optical path length L by $\Delta L$ $(-\Delta L)$ (step 305). This process is repeated (steps 305–307) in the manner described above until $P_r$ is less than $P_{limit}$, and then the optical delay line driving signal $S_D$ is restored to 0 at which time (step 306→step 301). With this process, the change of the cavity optical path length can be suppressed and stable operation can be maintained.

Next, another algorithm of the electrical signal processing circuit 13, when using the optical delay lines which are shown in FIGS. 5A and 5B as the optical delay line 8 in FIG. 1, will be described. In this case, as in the above-described process for the optical delay lines in FIGS. 4A and 4B, first, the cavity optical path length is swept; second, the driving signal value $S_{Da}$ is detected, where the electrical power $P_r$ of a relaxation oscillation frequency component is a minimum value; and third, the initial value $L_0$ of the optical path length is set. However, the optical delay lines in FIGS. 5A and 5B are different from the optical delay lines in FIGS. 4A and 4B. Since the amount of optical delay is determined according to the absolute values of the driving signals, it is required to maintain the driving signal value $S_D$ as $S_{Da}$ continuously to maintain the optical delay amount.

When a temperature change, etc., changes the optical path length and the electrical power Pr of the relaxation oscillation frequency component exceeds a predetermined maximum allowable electrical power $P_{limit}$, the optical delay line driving signal $S_D$ is changed from $S_D$ to $S_D+\Delta S_D$ (i.e., L→L+$\Delta$L) and the change of the electrical power $P_r$ is monitored. If the electrical power $P_r$ decreases after that, the above-described process to increase $S_D$ is repeated further, until the electrical power $P_r$ is below the maximum allowable electrical power $P_{limit}$. When $P_r$ is less than $P_{limit}$, the increment of the optical delay line driving signal $S_D$ is stopped. In contrast, when the electrical power $P_r$ increases, the optical delay line driving signal $S_D$ is changed to $S_D-\Delta S_D$ (L→L−$\Delta$L); and this process is repeated until $P_r$ is less than $P_{limit}$ like the above. With this process, the cavity optical path length change can be suppressed and stable operation can be achieved.

Figure 7:
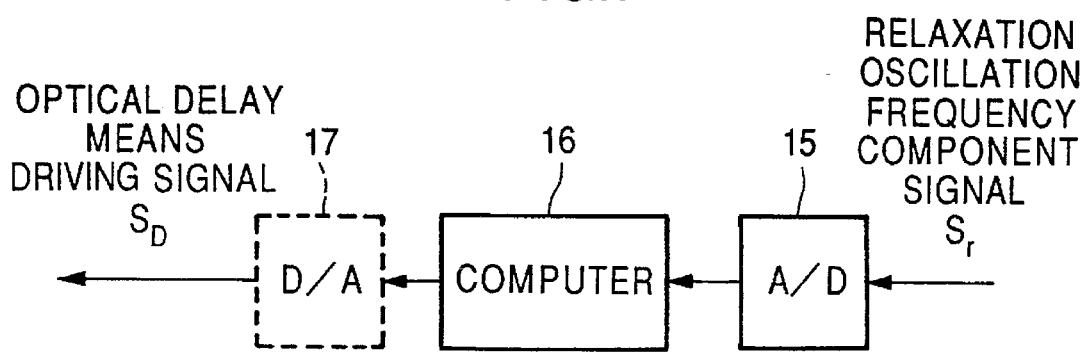
FIG. 7 is a schematic diagram which shows a composition example of the electrical signal processing circuit 13 which is shown in FIG. 1.

FIG. 7 shows an example of the inside configuration of the electrical signal processing circuit 13 shown in FIG. 1. The electrical signal processing circuit 13 comprises a computer 16 such as a microcomputer, an analog/digital converter 15, and a digital/analog converter 17. The analog/digital converter 15 changes the relaxation oscillation frequency component signal $S_r$, which is an analog signal, into a digital signal. Then, the optical delay line driving signal is determined to have a predetermined polarity and a predetermined number of pulses or a predetermined level, according to the above-described algorithm, by the computer 16. In the case of using the optical delay line in FIGS. 4A or 4B, which is driven by a digital signal, as the optical delay line 8, without passing through the digital/analog converter 17, the optical delay line driving signal $S_D$ is input from the computer 16 directly to the optical delay line 8. On the other hand, in the case of using the optical delay line in FIGS. 5A or 5B, which is driven by an analog driving signal, the analog optical delay line driving signal $S_D$ is generated using the digital/analog converter 17.

As described above, this preferred embodiment extracts the relaxation oscillation frequency component signal Sr out of the electrical signal S output from the photoelectric converter 10 using the amplifier 12 (the a band pass filter) and it feeds back the driving signal $S_D$ from the electrical signal processing circuit 13 into the optical delay line 8, which is installed in the cavity, to suppress the electrical power $P_r$ of the relaxation oscillation frequency component. The embodiment can maintain the cavity optical path length to be constant and can realize a stable mode-locked laser operation.

Second Preferred Embodiment

Figure 8:
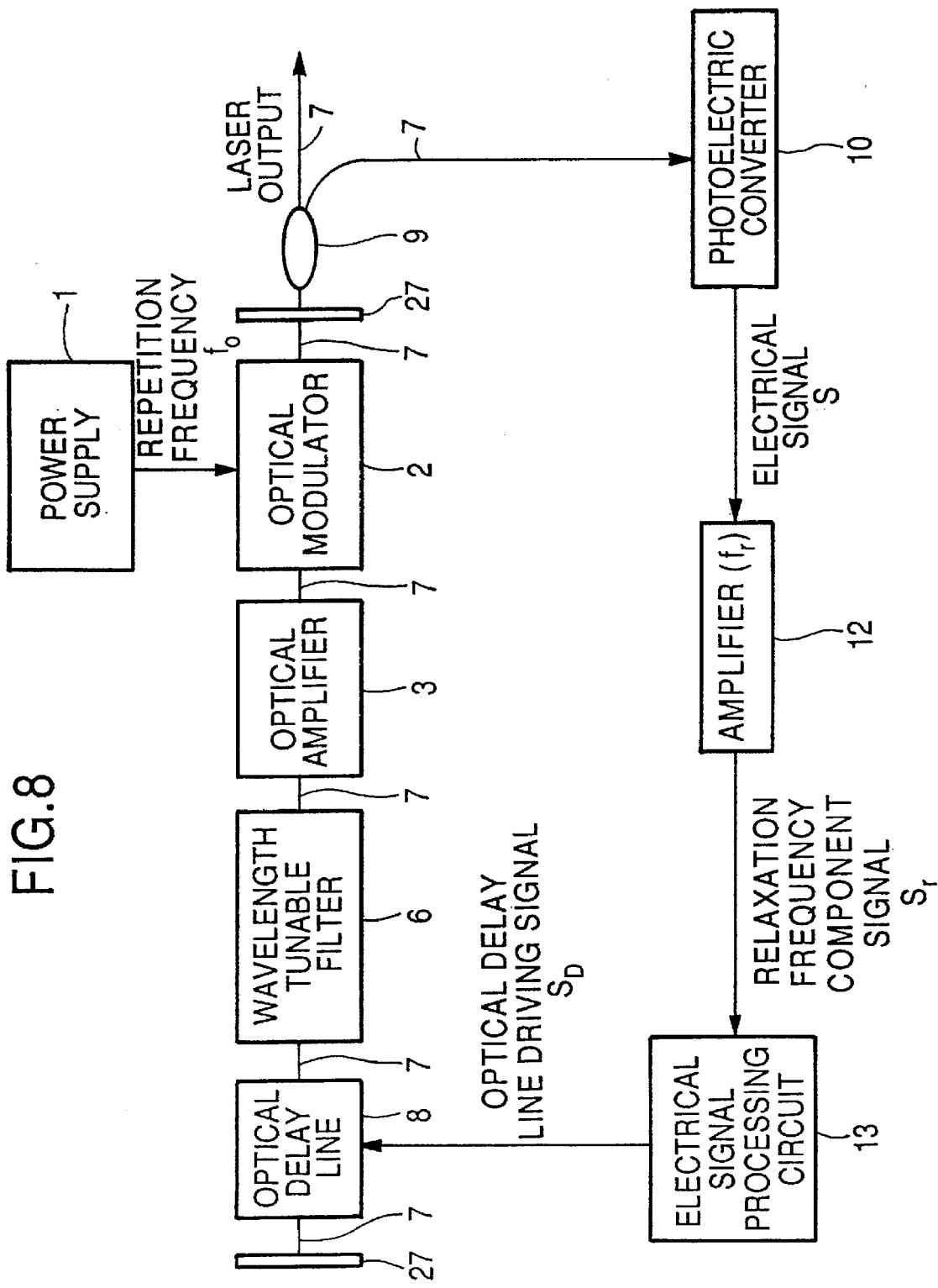
FIG. 8 is a schematic diagram that shows a second preferred embodiment according to this invention.

FIG. 8 shows another preferred embodiment of the stabilizing apparatus of a Fabry-Perot cavity-type mode-locked laser according to the invention. Identical reference numerals are attached, in this figure, to the respective elements, which correspond to those in FIG. 1. The Fabry-Perot cavity-type mode-locked laser shown in this figure further comprises an optical reflector 27 which reflects most of the incident light. This preferred embodiment has basically the same configuration as the first preferred embodiment, except which the type of cavity is a Fabry-Perot type; and stable operation can in principle be achieved by processes similar to those in the first preferred embodiment.

According to the invention, as explained above referring to the first and the second preferred embodiments, the optical delay line driving signal is fed back into the optical delay line in the cavity to suppress the electrical power of the relaxation oscillation frequency component of the electrical signal, which is converted from the optical signal output from the mode-locked laser. The change of the cavity length, which is caused by temperature change, etc., can be detected with good sensitivity. Therefore, the optical delay line can be controlled with extraordinary precision and good stabilization of the output of the mode-locking laser can be realized.

In addition, because methods according to the invention monitor the relaxation oscillation frequency component, which is the index of the stability of the laser output, this invention can realize stabilization with higher reliability than conventional methods.

Furthermore, since an identical configuration can be applied to mode-locked oscillations at any longitudinal mode frequencies, the invention can be widely applied.

Third Preferred Embodiment

Figure 10:
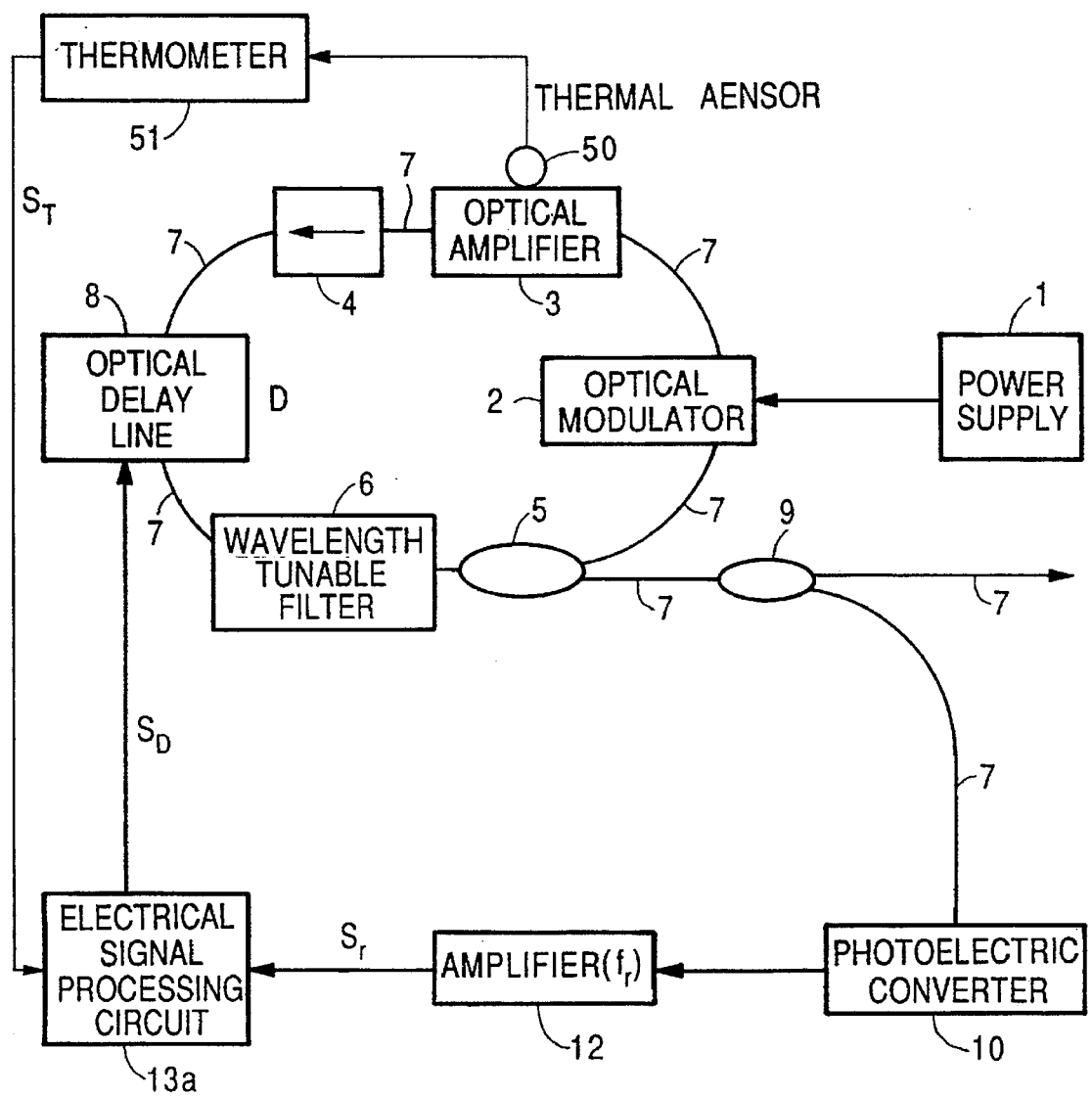
FIG. 10 is a schematic diagram of a third preferred embodiment according to this invention.

FIG. 10 shows another preferred embodiment of a ring cavity-type mode-locked laser stabilizing apparatus and method according to the invention. This third preferred embodiment further comprises, in addition to the elements of the first preferred embodiment, a temperature sensor 50 and a thermometer 51, which converts the output of the temperature sensor 50 into a voltage or an electrical current. The other components are the same as those of the first preferred embodiment. As the temperature sensor 50, a platinum resistor and a thermistor, whose resistance value changes depending on temperature T, etc., can be used.

Figure 11:
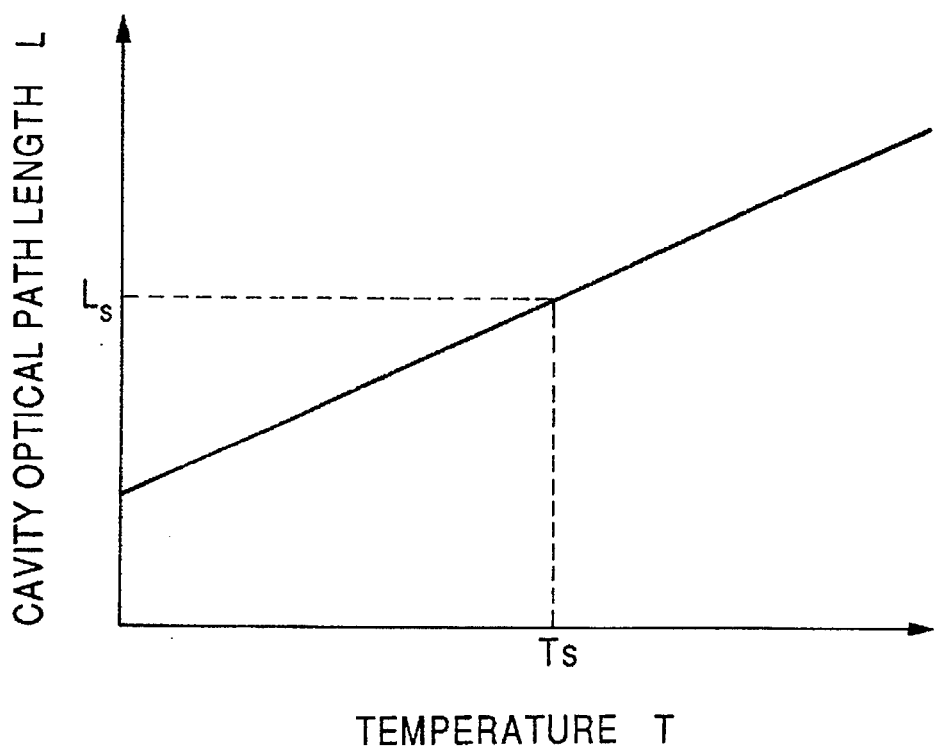
FIG. 11 is a diagram which shows the relationship between the temperature of a cavity T and the optical path length L thereof.

This third preferred embodiment uses a method to fix the initial value $L_1$ of the cavity optical path length of the mode-locked laser automatically by additional temperature detection and then to stabilize the output of the mode-locked lasers by controlling the cavity optical path length more precisely to suppress the relaxation oscillation frequency components, as explained in the first preferred embodiment. There is a relationship, as shown in FIG. 11, between the temperature T of the cavity and the cavity optical path length L. The cavity optical path length L is elongated (or shortened) due to thermal expansion when the temperature T of the cavity increases (or decreases). Generally, the relationship between T and L can be approximately expressed by the following formula by supposing that $\alpha$ is a coefficient of thermal expansion of the cavity length, $T_s$ is a certain standard temperature, and $L_s$ is the cavity optical path length at which the mode-locking condition is fulfilled at the standard temperature $T_s$.

$$L=L_s\{1+\alpha(T-T_s)\} \quad (6)$$

By differentiating this formula, it is possible to show that amount of the change $\delta L$ of the cavity optical path length approximately depends on the temperature change $\delta T$ by the following formula.

$$\delta L \cong L_s \cdot \alpha \cdot \delta T \quad (7)$$

In the operation procedure of this preferred embodiment, first, the cavity optical path length L is set at the value $L_s$, at which the mode-locking condition at the standard temperature $T_s$ is fulfilled, beforehand. Then, at the start of the operation of the mode-locked laser, the temperature T of the cavity is detected by the temperature sensor 50. After that, the electrical signal processing circuit 13 changes the optical delay D of the optical delay line 8 to compensate the cavity optical path length change $\delta L$, which is given by formula (7), due to the temperature change $\delta T$, where $\delta T$ equals T minus $T_s$.

$$\delta D = -\delta L = -L_s \cdot \alpha(T-T_s) \quad (8)$$

The resultant cavity optical path length from the above-described process is used as an initial value. Then, the electrical signal processing circuit 13 starts to control the optical delay line 8 to suppress a relaxation oscillation frequency component and to maintain the cavity optical path length to be constant as in the first and the second preferred embodiments.

For example, when most of the components of the cavity comprise optical fibers like a mode-locked fiber laser, the thermal expansion coefficient $\alpha$ is about $10^{-5}$ (1/°C.). When a temperature change T minus $T_s$ is 1 (° C.) and the standard cavity optical path length $L_s$ is 100 m, the cavity optical path length increases by about 1 mm. Therefore, in that case, by decreasing the cavity optical path length by the same length with the optical delay line 8, the change of the cavity optical path length can be compensated.

The control precision of the cavity optical path length by this temperature detection can be calculated with formula (7). Generally, the precision $\delta T$ of a thermometer is about $10^{-2}$ (°C.). In the case of the above mode-locked fiber laser, the control precision $\delta L$ of the cavity optical path length is, therefore, about 10 μm. This precision $\delta L$ is within the pull-in range (about ±50 μm) of the relaxation oscillation frequency component suppression method according to the invention; i.e., the pull-in range is a range at which the mode-locking condition is able to be established by the methods according to the invention (see FIG. 3). Therefore, even if the initial value of the cavity optical path length which is set by the temperature detection process above is out of the stable operation range shown in FIG. 6, the cavity optical path length can be automatically pulled-in into the stable operation range according to the algorithm (see FIG. 9) of the relaxation oscillation frequency component suppression method.

Figure 12:
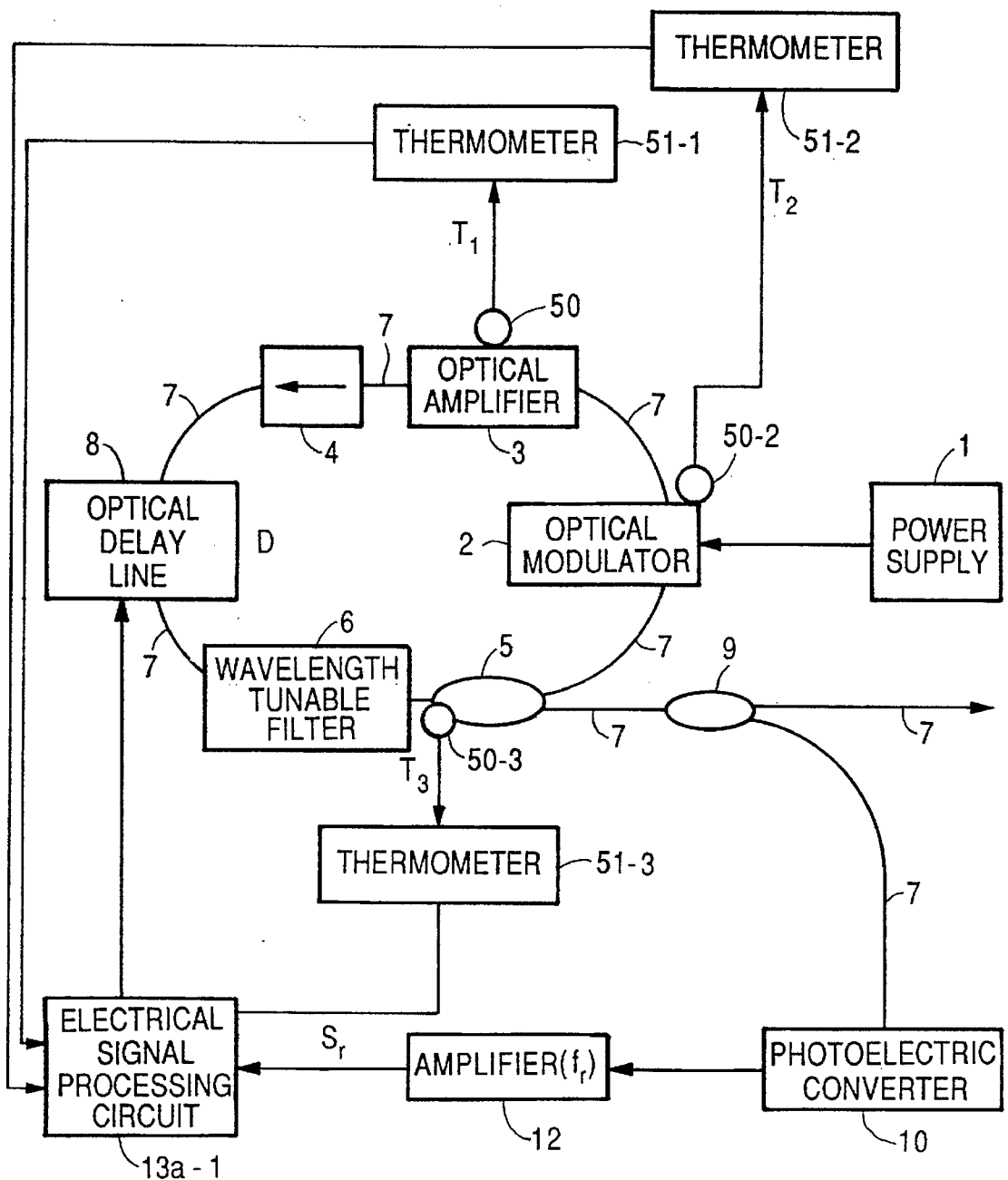
FIG. 12 is a schematic diagram which shows another example of the third preferred embodiment shown in FIG. 10.

As shown in FIG. 12, when the temperature distribution of the cavity is not uniform, temperatures at more than one of the positions (equal to or greater than two positions; the optical amplifier 3, the optical modulator 2, and the optical coupler 5 in this example in this figure) may be detected in the cavity using a plurality of temperature sensors; sensors 50-1, 50-2, and 50-3 and thermometers 51-1, 51-2, and 51-3 are used in this example. In this case, signal processing can be proceeded in the electrical signal processing circuit 13a-1 based on an average temperature $T_{ave}$, which may be defined by the following formula.

$$T_{ave}=k_1 \cdot T_1+k_2 \cdot T_2+\ldots+k_i \cdot T_i \text{ (i: a natural number)} \quad (9)$$

Each temperature coefficient $k_i$ of formula (9) may be obtained by measuring the relationship between the temperatures $(T_1, T_2, \ldots, T_i)$ of each position and the cavity optical path length L beforehand; and by setting the temperature coefficients $(k_1, k_2, \ldots, k_i)$ to make the relationship between average temperature $T_{ave}$ and the cavity optical path length L to be linear. By replacing T with $T_{ave}$ in formula (8) after that, as in the above-described temperature detection at one position, which is shown in FIG. 10, the initial value of the cavity optical path length can be quickly determined from the average temperature $T_{ave}$.

In addition, in this preferred embodiment, an explanation with respect to a ring cavity-type mode-locked laser has been made, but the invention may also be applied to a Fabry-Perot cavity-type mode-locked laser.

Fourth Preferred Embodiment

Figure 13:
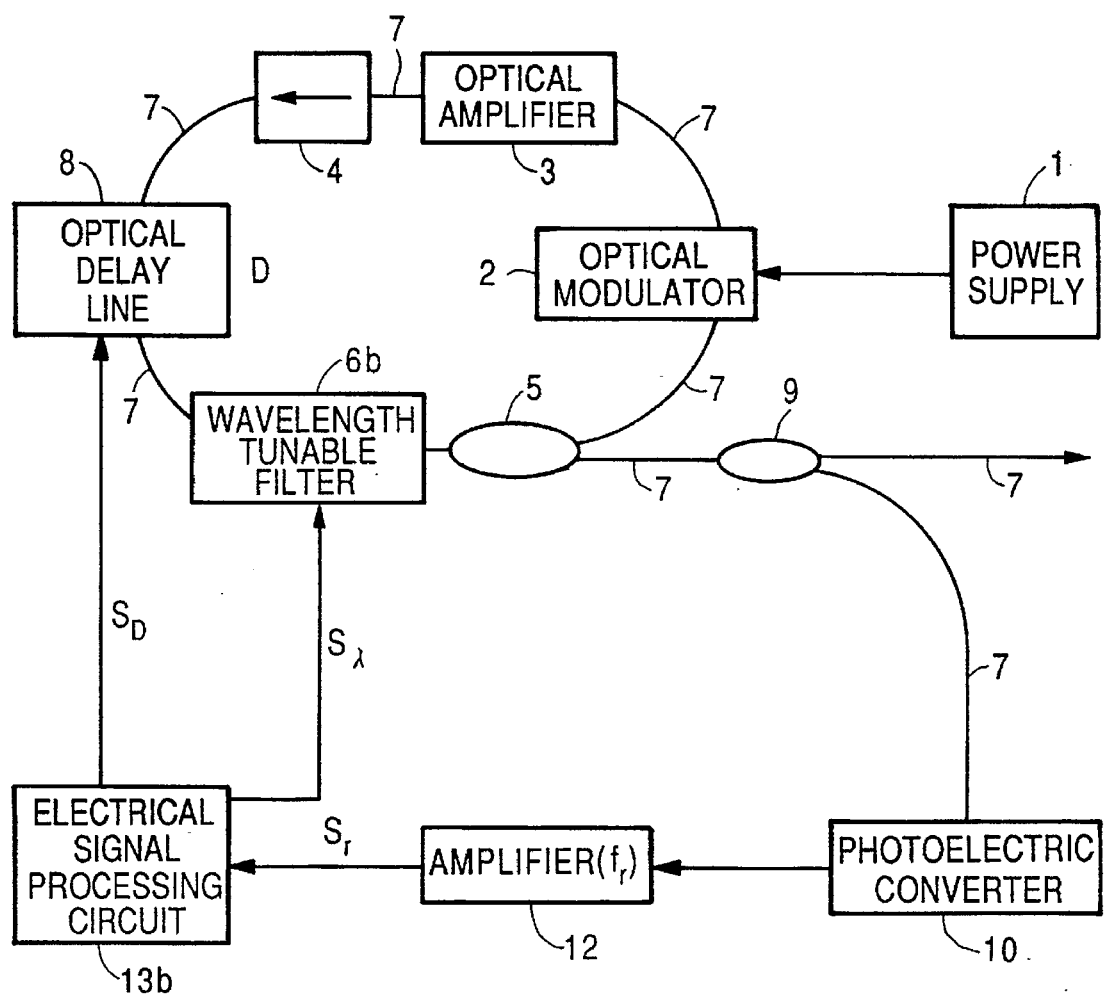
FIG. 13 is a schematic diagram of a forth preferred embodiment according to this invention.

FIG. 13 is a diagram which shows another preferred embodiment of the ring cavity-type mode-locked laser stabilization method and apparatus according to the invention. This preferred embodiment comprises a wavelength tunable filter 6B which can control a filtering wavelength in response to an electrical signal $S_\lambda$ from the electrical signal processing circuit 13b. The embodiment can electrically control the oscillation wavelength of the mode-locked laser. The other components are the same as those of the first preferred embodiment.

Figure 14A:
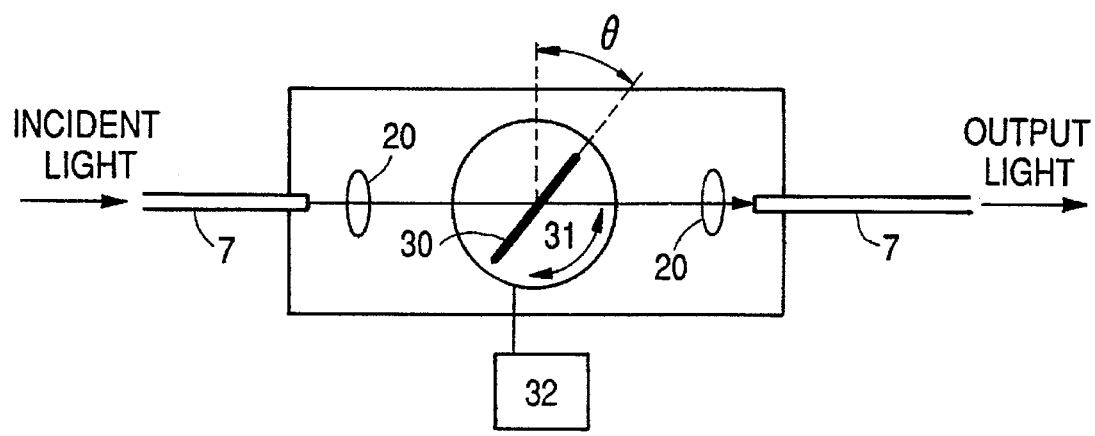
FIGS. 14A and 14B are schematic diagrams that show examples of the wavelength tunable filter shown in FIG. 13.
Figure 14B:
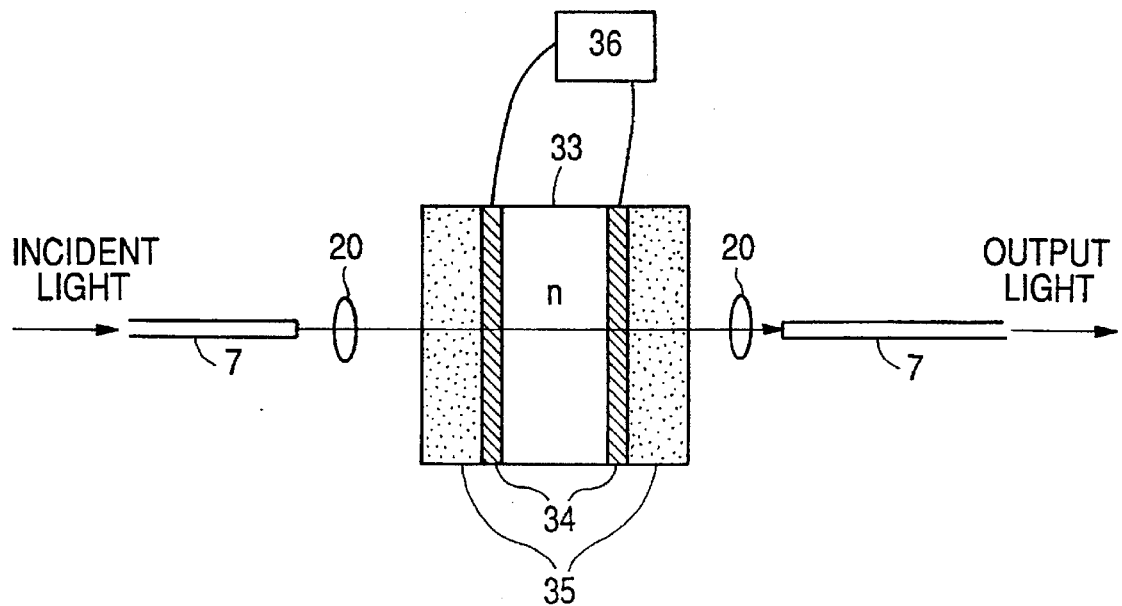

FIGS. 14A and 14B show examples of the wavelength tunable filter 6B. The wavelength tunable filter 6b-1 which is shown in FIG. 14A comprises two optical lenses 20, an optical filter board 30 which consists of a dielectric multiple film, etc., an electrical drive stage 31 which turns the optical filter board 30, and power supply 32 for driving the stage. The wavelength tunable filter 6b-1 can electrically control the filtering wavelength by turning optical filter board 30 via the electric stage 31 to change the angle θ between the board surface and the beam axis. The wavelength tunable filter 6b-2 which is shown in FIG. 14B comprises two optical lenses 20, liquid crystal 33, mirrors 34, substrates 35, and a power supply 36 for driving the liquid crystal 33. The wavelength tunable filter 6b-2 also can control the filtering wavelength electrically by changing electric fields applied to liquid crystal 33 to change the refractive index n of liquid crystal 33.

The method of this preferred embodiment may be used when the oscillation wavelength of the mode-locked laser is changed. In this method, an initial value $L_1$ of the cavity optical path length is determined automatically according to an arbitrarily set wavelength. After that, the cavity optical path length is controlled precisely by the above-described relaxation oscillation frequency component suppression method and the output of the mode-locked laser can be stabilized thereby.

Figure 15:
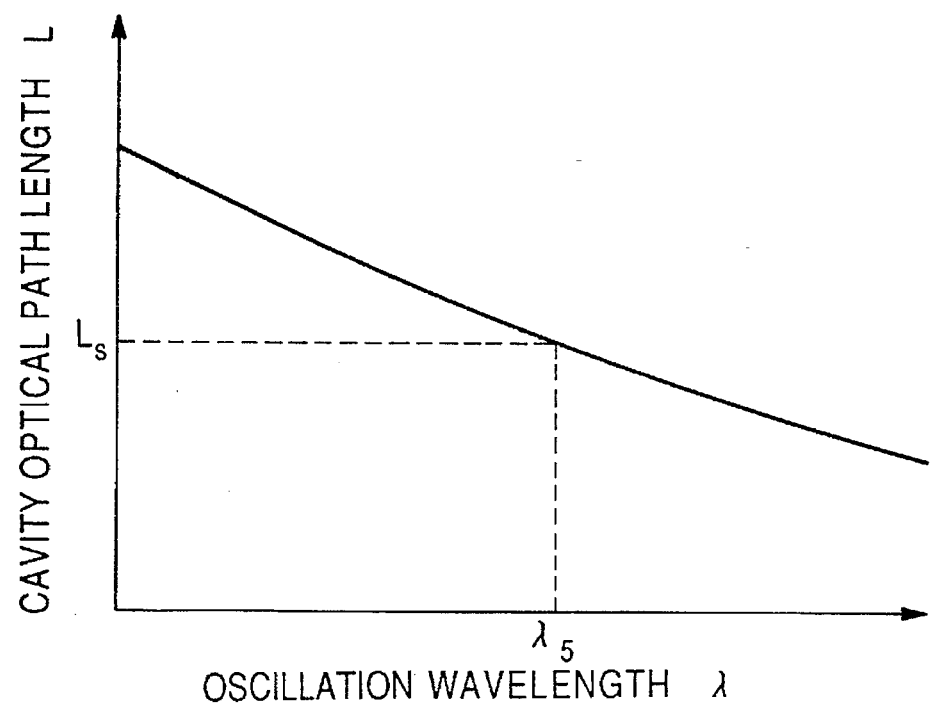
FIG. 15 is a diagram that shows the relationship between the oscillating center wavelength $\lambda$ and the cavity optical path length L.

There is a general relationship as shown in FIG. 15 between the oscillation wavelength $\lambda$ of a mode-locked laser path length L. The cavity optical path length L decreases (or increases) due to the wavelength dispersion of the refractive index of the cavity when the oscillation wavelength $\lambda$ increases (or decreases). This change $\delta L$ of the cavity optical path length may be expressed by the following formula (10) based on formula (1).

$$\delta L = \Sigma(h_i \cdot \partial n_i(\lambda)) = \left\{ \Sigma \left( h_i \cdot \frac{\partial n_i(\lambda)}{\partial \lambda} \right) \right\} \cdot \delta\lambda \qquad (10)$$

On the other hand, the relationship between the wavelength and the refractive index may be obtained by the following formula according to the Sellmeier equation (reference: G. P. Agrawal, "Nonlinear fiber optics", Academic Press, chapter 1, p. 7)

$$n(\lambda) = \left( 1 + \sum_{j=1}^{m} \frac{A_j \lambda_j^2}{\lambda_j^2 - \lambda^2} \right)^{1/2} \qquad (11)$$

Here, $A_j$ and $\lambda_i$ are constants which are determined by the cavity component medium.

In the operation procedure of this preferred embodiment, first, the cavity optical path length L is set at a value $L_s$ at which the mode-locking condition is fulfilled in a standard wavelength $\lambda_s$ beforehand. In addition, each physical length $h_i$ and each wavelength dispersion $\partial n_i(\lambda)/\partial\lambda$ of the refractive index of each component is also measured beforehand. Then, when starting the operation of the mode-locked laser, the wavelength tunable filter 6B is driven by the electrical signal processing circuit 13b to set the oscillation wavelength $\lambda$ to be a desired value. Next, the optical delay line 8 is driven by the electrical signal processing circuit 13b to change the optical delay D to compensate for the cavity optical path length change $\delta L$ (see formula (12)), which is determined by the oscillation wavelength change $\delta\lambda(=\lambda-\lambda_s)$ and formulas (10) and (11).

$$\delta D = -\delta L = -\left\{ \Sigma \left( h_i \cdot \frac{\partial n_i(\lambda)}{\partial \lambda} \right) \right\} \cdot (\lambda - \lambda_s) \qquad (12)$$

Then, resultant cavity optical path length from the above-described process is used as an initial value. The cavity optical path length is controlled precisely to maintain the cavity optical path length to be constant like first and the second preferred embodiments by the relaxation oscillation frequency component suppression method. For example, supposing that most of the components of a cavity comprise optical fibers like a mode-locked fiber laser and that the wavelength dispersion of the refractive index of the cavity may be regarded as almost constant, then formula (12) may be transformed to the following formula.

$$\delta D = -\delta L = -\frac{L_s}{n} \cdot \frac{\partial n(\lambda)}{\partial \lambda} \cdot (\lambda - \lambda_s) \qquad (13)$$

The control precision of the optical path length by this wavelength change can be calculated from formulas (10) and (11). For example, when most of the components of a cavity comprise optical fibers like a mode-locked fiber laser, the refractive index wavelength dispersion $\partial n(\lambda)/\partial\lambda$ is about $-10^{-5}$ (1/nm); and generally, the wavelength precision $\delta\lambda$ of an optical filter is about $10^{-1}$ (nm). Hence, in a case in which the cavity optical path length $L_s$ is 50 m and the refractive index $n(\lambda)$ is 1.5, the control precision $\delta L$ of the optical path length may be obtained to be about 30 μm from formula (13). This precision is within the pull-in range (about ±50 μm) of the relaxation oscillation frequency component suppression method according to the invention, which is shown in FIG. 3. Therefore, even if the initial value of the cavity optical path length is out of the stable operation range shown in FIG. 6, the cavity optical path length can be automatically pulled-in into the stable operation range according to the algorithm (see FIG. 9) of the relaxation oscillation frequency component suppression method.

As described above, this preferred embodiment provides a method for stabilizing the laser output by using the relaxation oscillation frequency component suppression method after controlling the optical path length of the cavity in response to the setting value of the oscillation wavelength. By this method, stabilization of the mode-locked laser output can be established quickly and automatically at an arbitrarily selected wavelength.

While a ring cavity-type mode-locked laser is used at this preferred embodiment, a Fabry-Perot cavity-type mode-locked lasers also can be applied to this embodiment.

Fifth Preferred Embodiment

Figure 16:
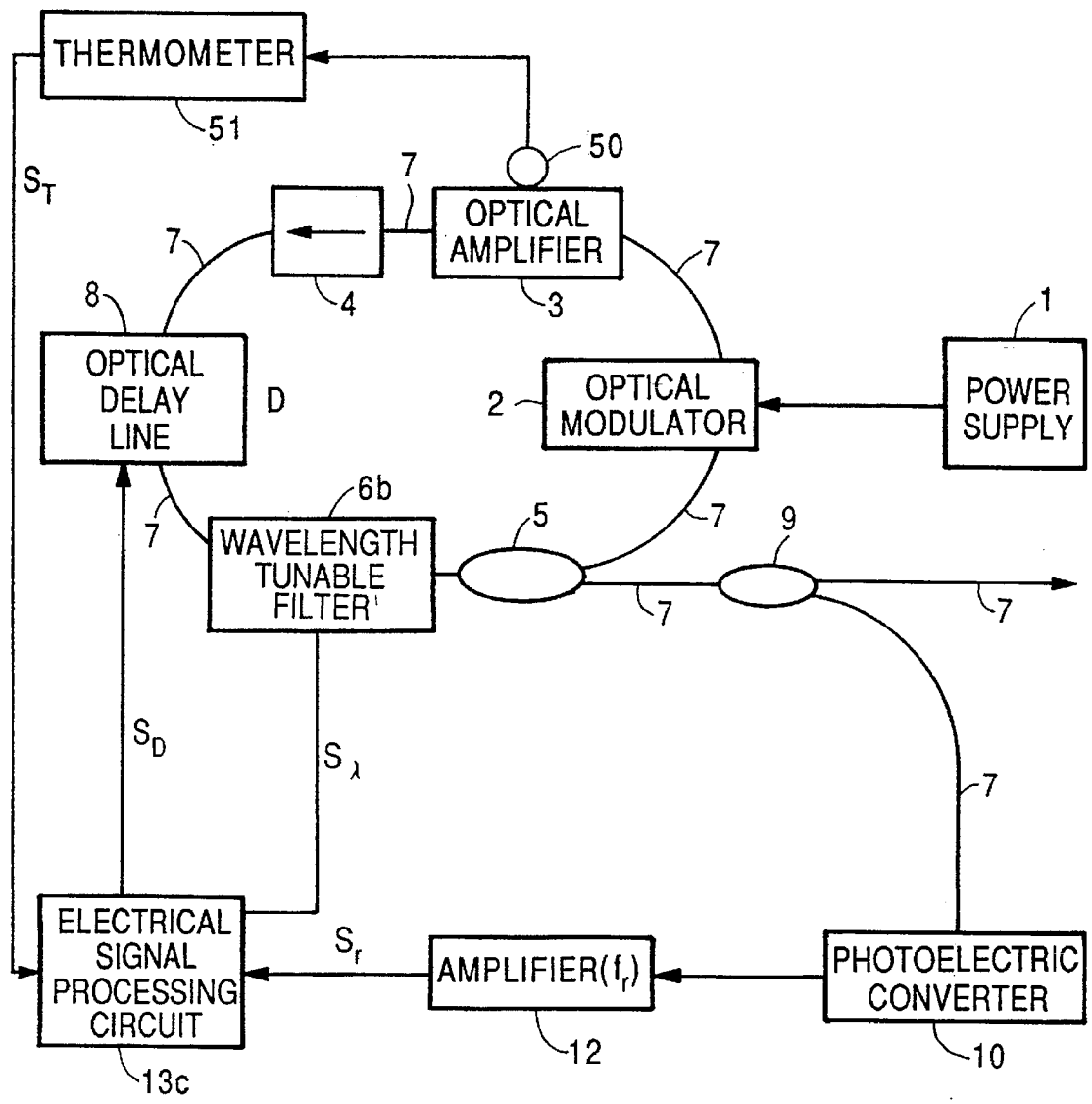
FIG. 16 shows a fifth preferred embodiment by this invention.

FIG. 16 is a diagram which shows another preferred embodiment of a ring cavity-type mode-locked laser stabilizing apparatus and method thereby according to the invention. This preferred embodiment comprises a combination of the method of automatically setting the initial value of the cavity optical path length by temperature detection in the third preferred embodiment and the method of automatically setting the initial value of the cavity optical path length in response to a setting value of the oscillation wavelength in the fourth preferred embodiment.

In the operation procedure of this preferred embodiment, first, the cavity optical path length L is set at a value $L_s$ which fulfills the mode-locking condition in a certain standard oscillation wavelength $\lambda_s$ and a standard temperature $T_s$ beforehand. Physical lengths $h_i$ and wavelength dispersions $\partial n(\lambda)/\partial\lambda$ of the refractive indexes of the components are also measured beforehand. Then, at the of beginning the operation of the mode-locked laser, the wavelength tunable filter 6b is driven by the electrical signal processing circuit 13c to set the wavelength at a desired value $\lambda$, whereas the temperature T of the cavity detected with the temperature sensor 50 is input to the electrical signal processing circuit 13. The total change of the cavity optical path length $\delta L_{total}$ is expressed by $\delta L_T$ plus $\delta L_\lambda$ ($\delta L_{total} = \delta L_T + \delta L_\lambda$), where $\delta L_T$ is the change due to the temperature change and $\delta L_\lambda$ is the change due to the oscillation wavelength change. Then, the electrical signal processing circuit 13c outputs a driving signal to the optical delay line 8 to compensate the total cavity optical path length change $\delta L_{total}$. The optical delay change $\delta D$ in this case is shown by the following formula based on formulas (8) and (13).

$$\delta D = -\delta L_{total} = -L_T - \delta L_\lambda = -\alpha \cdot L_S \cdot (T - T_S) - \qquad (14)$$
$$\left\{ \Sigma \left( h_i \cdot \frac{\partial n_i(\lambda)}{\partial \lambda} \right) \right\} \cdot (\lambda - \lambda_S)$$

The resultant cavity optical path length is used as an initial value. Then, the cavity optical path length is maintained to be constant by the relaxation oscillation frequency component suppression method, like the first and the second preferred embodiments.

As described above, this preferred embodiment provides a method for stabilizing the mode-locked laser output by the relaxation oscillation frequency component suppression method, after controlling the optical path length of the cavity according to a setting value of the oscillation wavelength and to the temperature of the cavity. By this method, stable operation of a mode-locked laser can be established quickly and automatically in any arbitrarily selected wavelength and any temperature.

What is claimed is:

1. A method of stabilizing an output of a mode-locked laser comprising the steps of:

extracting at least one component from among a relaxation oscillation frequency component and harmonic components thereof in the output of the mode-locked laser;

using the extracted at least one component as an error signal; and adjusting an optical path length of a laser cavity to reduce the error signal below a predetermined level.

2. The method according to claim 1, further comprising the steps of:

sweeping an entire optical path length of the laser cavity over a range of lengths within operating temperatures of the mode-locked laser;

measuring a change in the error signal during the sweeping step; and resetting the optical path length so as to minimize said error signal.

3. The method according to claim 1, further comprising the steps of:

determining a temperature of a portion of the mode-locked laser; and adjusting the optical path length in accordance with the temperature.

4. The method according to claim 1, further comprising the steps of:

selecting an oscillating wavelength using a wavelength-tunable filter; and adjusting the optical path length according to the selected wavelength.

5. A mode-locked laser stabilized apparatus comprising:

a mode-locked laser comprising:

optical modulating means for modulating an input optical signal based on a specific frequency;

optical amplifying means for amplifying the modulated optical signal output from the optical modulating means; and optical branching means for outputting an optical signal from a mode-locked laser cavity;

optical path length changing means for changing the optical path length of the mode-locked laser cavity;

optical splitting means for splitting the laser output;

converting means for converting an optical signal in the split laser output into an electrical signal;

extracting means for extracting at least one component from among a relaxation oscillation frequency and harmonic components thereof from the electrical signal for use as an error signal in feedback control of the optical path length changing means; and electrical signal processing means for receiving the error signal and for outputting a signal to control the optical path length changing means to reduce the error signal below a predetermined value.

6. The mode-locked laser according to claim 5, further comprising:

temperature determining means for determining a temperature of at least one component of the mode-locked laser, wherein the signal output from the electrical signal processing means controls the optical path length of the laser cavity in accordance with the determined temperature.

7. The mode-locked laser according to claim 5, further comprising:

wavelength tunable filter means, coupled to the mode-locked laser cavity, for selecting an oscillating wavelength, wherein the signal output from the electrical signal processing means controls the optical path length of the laser cavity in accordance with the selected wavelength.

8. The mode-locked laser according to claim 5, further comprising:

temperature determining means for determining a temperature of at least one component of the mode-locked laser; and wavelength turnable filter means, coupled to the mode-locked laser cavity, for selecting an oscillating wavelength, wherein the signal output from the electrical signal processing means controls the optical path length of the laser cavity in accordance with the determined temperature and the selected wavelength.

\* \* \* \* \*

UNITED STATES PATENT AND TRADEMARK OFFICE
CERTIFICATE OF CORRECTION

PATENT NO. : 5,646,774
DATED : July 08, 1997
INVENTOR(S) : Hidehiko TAKARA et al.

It is certified that error appears in the above-identified patent and that said Letters Patent is hereby corrected as shown below:

On the Title Page, Item [57], in the Abstract, line 8, "pulses" should read --pulse--.

Signed and Sealed this

Twenty-second Day of September, 1998

Attest:

BRUCE LEHMAN

Attesting Officer

Commissioner of Patents and Trademarks